(12) United States Patent
Chen et al.

(10) Patent No.: US 10,481,772 B2
(45) Date of Patent: Nov. 19, 2019

(54) WIDGET DISPLAYING METHOD AND APPARATUS FOR USE IN FLEXIBLE DISPLAY DEVICE, AND STORAGE MEDIUM

(71) Applicant: Beijing Zhigu Rui Tuo Tech Co., Ltd., Haidian District, Beijing (CN)

(72) Inventors: Chaoyuan Chen, Beijing (CN); Kuifei Yu, Beijing (CN); Chi Liu, Beijing (CN); Mengjie Shi, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 145 days.

(21) Appl. No.: 15/701,424

(22) Filed: Sep. 11, 2017

(65) Prior Publication Data
US 2018/0074682 A1 Mar. 15, 2018

Related U.S. Application Data

(63) Continuation-in-part of application No. PCT/CN2016/098597, filed on Sep. 9, 2016.

(51) Int. Cl.
G06F 3/0484 (2013.01)
G06F 1/16 (2006.01)
(Continued)

(52) U.S. Cl.
CPC ........ G06F 3/04842 (2013.01); G06F 1/1652 (2013.01); G06F 3/0414 (2013.01);
(Continued)

(58) Field of Classification Search
None
See application file for complete search history.

(56) References Cited

U.S. PATENT DOCUMENTS

2008/0291225 A1 11/2008 Arneson
2013/0120239 A1* 5/2013 Suzuki .................. G06F 1/1643
345/156
(Continued)

FOREIGN PATENT DOCUMENTS

CN 104216657 A 12/2014
CN 104503725 A 4/2015
(Continued)

OTHER PUBLICATIONS

International search report of PCT/CN2016/098597, mailed from the State Intellectual Property Office of China dated May 31, 2017.
(Continued)

Primary Examiner — Nicholas J Lee
(74) Attorney, Agent, or Firm — Jun He Law Offices P.C.; James J. Zhu

(57) ABSTRACT

The present disclosure provides a widget displaying method and apparatus, and a storage medium, which pertain to the field of flexible display technology. The method comprises: acquiring pressure bearing capacity information of the flexible display device, the pressure bearing capacity information indicating pressure bearing capacities of a plurality of areas on the flexible display device; determining a force bearing area on the flexible display screen, based on the pressure bearing capacity information; and displaying a touchable widget, based on the force bearing area. The present disclosure addresses the problem that the flexible display device bends under gravity, which makes it difficult for the user to perform touch operations on the flexible display screen, and achieves the effect that a touchable widget can be displayed on an area with a high pressure bearing capacity, thereby ensuring the stability when the user performs touch operations on the flexible display device (Continued)

and improving success rate and accuracy of the touch operations.

19 Claims, 19 Drawing Sheets

(51) Int. Cl.
    *G06F 3/041*           (2006.01)
    *G06F 3/0488*         (2013.01)
    *G06F 3/0482*         (2013.01)
    *G06F 3/0481*         (2013.01)

(52) U.S. Cl.
    CPC .......... *G06F 3/0482* (2013.01); *G06F 3/0488* (2013.01); *G06F 3/04817* (2013.01); *G06F 3/04883* (2013.01); *G06F 2203/04102* (2013.01)

(56) References Cited

U.S. PATENT DOCUMENTS

| | | | |
|---|---|---|---|
| 2013/0222416 A1 | 8/2013 | Kim et al. | |
| 2013/0300732 A1 | 11/2013 | Hosoya | |
| 2014/0098075 A1* | 4/2014 | Kwak | G06F 3/0487 345/204 |
| 2014/0198036 A1* | 7/2014 | Kim | G06F 1/1652 345/156 |

FOREIGN PATENT DOCUMENTS

| | | |
|---|---|---|
| CN | 104869230 A | 8/2015 |
| CN | 105718200 A | 6/2016 |
| CN | 105723315 A | 6/2016 |
| EP | 2648064 A2 | 10/2013 |

OTHER PUBLICATIONS

Christian Rendl et al., "Flex Sense: A Transparent Self-Sensing Deformable Surface", UIST 2014—Proceedings of the 27th Annual ACM Symposium on User Interface Software and Technology, Oct. 2014.

M L C de Laat et al., "A review on in situ stiffness adjustment methods in MEMS", Journal of Micromechanics and Microengineering, 26 (2016), published on May 9, 2016.

Extended European search report of European Patent Application No. 17189387.8, from the European Patent office, dated Nov. 29, 2017.

* cited by examiner

```
┌─────────────────────────────────┐
│   ACQUIRING PRESSURE            │
│   BEARING CAPACITY              │
│ INFORMATION OF A FLEXIBLE       │
│   DISPLAY DEVICE, THE           │──── 101
│ PRESSURE BEARING CAPACITY       │
│  INFORMATION INDICATING         │
│     PRESSURE BEARING            │
│ CAPACITIES OF A PLURALITY       │
│  OF AREAS ON THE FLEXIBLE       │
│        DISPLAY DEVICE           │
└─────────────────────────────────┘
                 │
                 ▼
┌─────────────────────────────────┐
│   DETERMINING A FORCE           │
│   BEARING AREA ON THE           │──── 102
│ FLEXIBLE DISPLAY SCREEN,        │
│  BASED ON THE PRESSURE          │
│     BEARING CAPACITY            │
│        INFORMATION              │
└─────────────────────────────────┘
                 │
                 ▼
┌─────────────────────────────────┐
│  DISPLAYING A TOUCHABLE         │──── 103
│ WIDGET, BASED ON THE FORCE      │
│        BEARING AREA             │
└─────────────────────────────────┘
```

FIG. 1

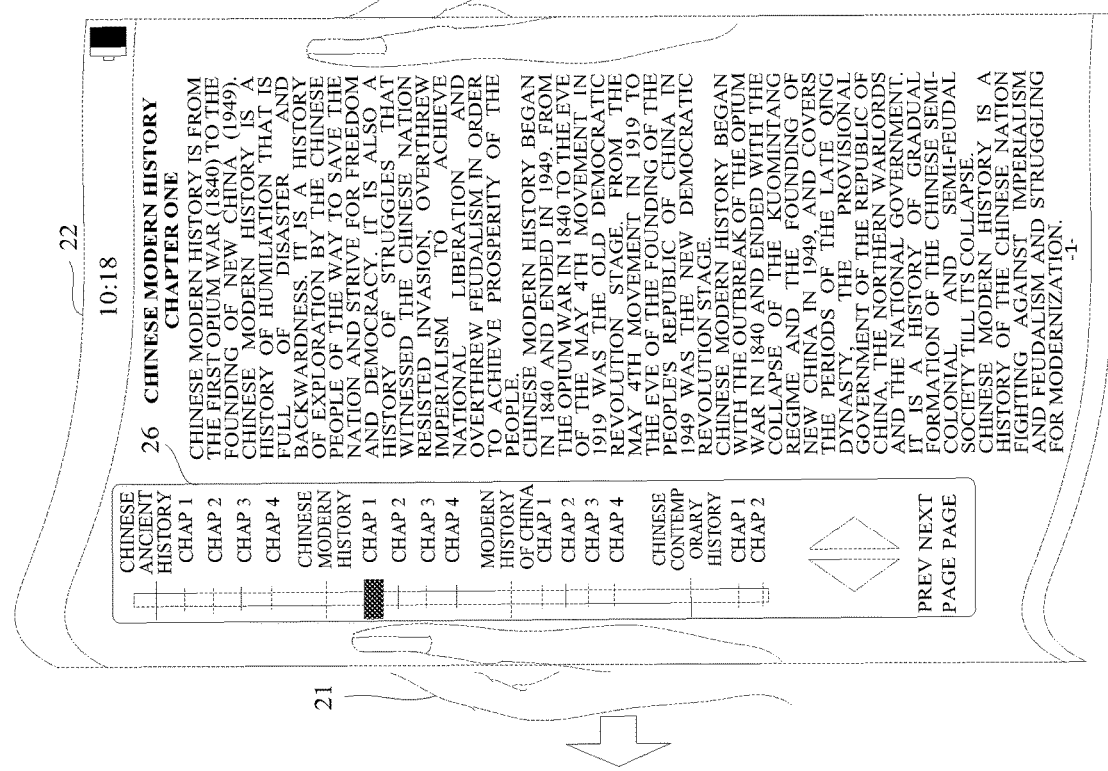
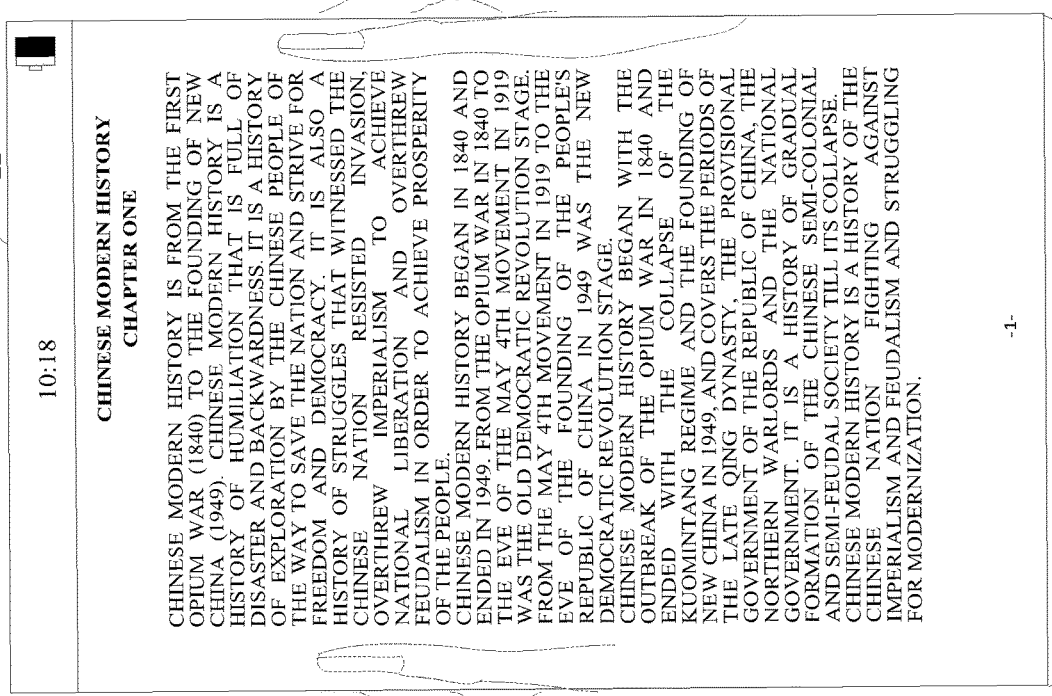
FIG. 3C

FIG. 3E

CHINESE MODERN HISTORY
CHAPTER ONE

CHINESE MODERN HISTORY IS FROM THE FIRST OPIUM WAR (1840) TO THE FOUNDING OF NEW CHINA (1949). CHINESE MODERN HISTORY IS A HISTORY OF HUMILIATION THAT IS FULL OF DISASTER AND BACKWARDNESS. IT IS A HISTORY OF EXPLORATION BY THE CHINESE PEOPLE OF THE WAY TO SAVE THE NATION AND STRIVE FOR FREEDOM AND DEMOCRACY. IT IS ALSO A HISTORY OF STRUGGLES THAT WITNESSED THE CHINESE NATION RESISTED INVASION, OVERTHREW IMPERIALISM TO ACHIEVE NATIONAL LIBERATION AND OVERTHREW FEUDALISM IN ORDER TO ACHIEVE PROSPERITY OF THE PEOPLE.

CHINESE MODERN HISTORY BEGAN IN 1840 AND ENDED IN 1949. FROM THE OPIUM WAR IN 1840 TO THE EVE OF THE MAY 4TH MOVEMENT IN 1919 WAS THE OLD DEMOCRATIC REVOLUTION STAGE. FROM THE MAY 4TH MOVEMENT IN 1919 TO THE EVE OF THE FOUNDING OF THE PEOPLE'S REPUBLIC OF CHINA IN 1949 WAS THE NEW DEMOCRATIC REVOLUTION STAGE.

CHINESE MODERN HISTORY BEGAN WITH THE OUTBREAK OF THE OPIUM WAR IN 1840 AND ENDED WITH THE COLLAPSE OF THE KUOMINTANG REGIME AND THE FOUNDING OF NEW CHINA IN 1949, AND COVERS THE PERIODS OF THE LATE QING DYNASTY, THE PROVISIONAL GOVERNMENT OF THE REPUBLIC OF CHINA, THE NORTHERN WARLORDS AND THE NATIONAL GOVERNMENT. IT IS A HISTORY OF GRADUAL FORMATION OF THE CHINESE SEMI-COLONIAL AND SEMI-FEUDAL SOCIETY TILL ITS COLLAPSE.

CHINESE MODERN HISTORY IS A HISTORY OF THE CHINESE NATION FIGHTING AGAINST IMPERIALISM AND FEUDALISM AND STRUGGLING FOR MODERNIZATION.

-1-

WIDGET DISPLAYING METHOD AND APPARATUS FOR USE IN FLEXIBLE DISPLAY DEVICE, AND STORAGE MEDIUM

CROSS REFERENCE TO RELATED APPLICATIONS

The present application is a continuation-in-part application of PCT application No. PCT/CN2016/098597 filed on Sep. 9, 2016, the content of which is incorporated herein by reference.

TECHNICAL FIELD

The present disclosure is related to the field of flexible display technology, and more particularly to a widget displaying method and apparatus for use in a flexible display device, and a storage medium.

BACKGROUND

A flexible display device is a novel display device consisting of a flexible display screen and a flexible substrate. As compared with conventional non-flexible display devices, the flexible display device exhibits higher foldability and portability.

When using a flexible display device with a touch control function, a user may hold the flexible display device in one hand while performing touch operations with the other hand. However, under the action of gravity, the flexible display device bends, making it difficult for the user to perform touch operations on the flexible display device.

SUMMARY

To reduce the difficulty in performing touch operations on a flexible display screen, the present disclosure provides a widget displaying method and apparatus for use in a flexible display device, and a storage medium as below.

According to a first aspect, there is provided a widget displaying method for use in a flexible display device. The method comprises: acquiring pressure bearing capacity information of the flexible display device, the pressure bearing capacity information indicating pressure bearing capacities of a plurality of areas on the flexible display device; determining a force bearing area on the flexible display screen, based on the pressure bearing capacity information; and displaying a touchable widget, based on the force bearing area.

According to a second aspect, there is provided a widget displaying apparatus for use in a flexible display device, the apparatus comprising: a processor; a flexible display screen electrically coupled with the processor; and a memory storing instructions executable by the processor. The processor is configured to: acquire pressure bearing capacity information of the flexible display device, the pressure bearing capacity information indicating pressure bearing capacities of a plurality of areas on the flexible display device; determine a force bearing area on the flexible display screen, based on the pressure bearing capacity information; and display a touchable widget, based on the force bearing area.

According to a third aspect of the present disclosure, there is provided a non-transitory computer-readable storage medium having stored therein instructions that, when executed by a processor of a mobile terminal, cause the mobile terminal to perform a widget displaying method, the method comprising: acquiring pressure bearing capacity information of the flexible display device, the pressure bearing capacity information indicating pressure bearing capacities of a plurality of areas on the flexible display device; determining a force bearing area on the flexible display screen, based on the pressure bearing capacity information; and displaying a touchable widget, based on the force bearing area.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a flowchart of a widget displaying method according to an exemplary embodiment;

FIG. 3C is a schematic implementation diagram of stretching of a flexible display device;

FIG. 3E is a schematic implementation diagram of a touchable widget removing process in the widget displaying method shown in FIG. 3D;

DETAILED DESCRIPTION

Figure 2A:
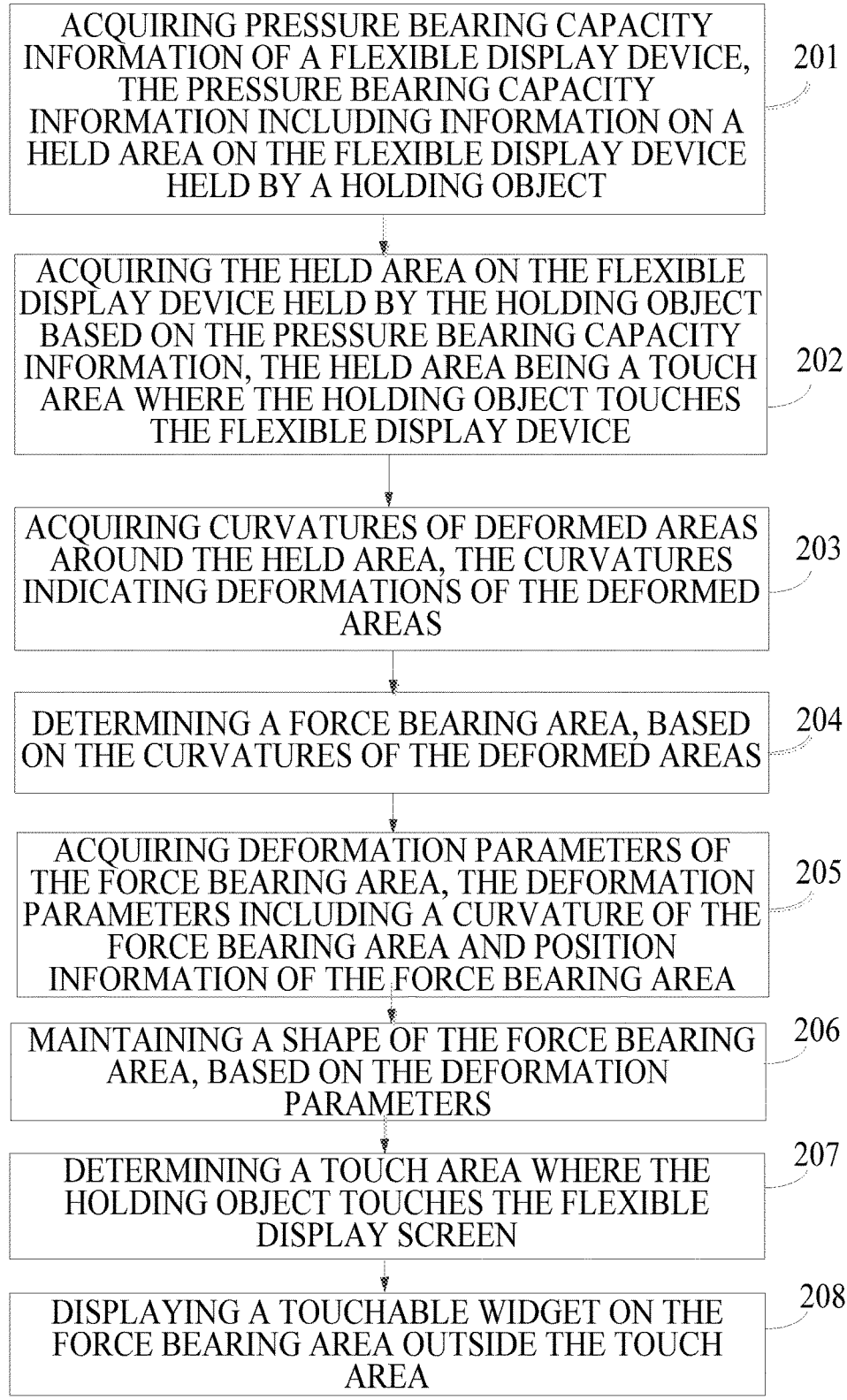
FIG. 2A is a flowchart of a widget displaying method according to another exemplary embodiment.

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

To facilitate understanding, terms referred to in embodiments of the disclosure will be explained in the following.

Flexible Display Device

A flexible display device is a display device having a flexible display screen and a flexible substrate. Optionally, the flexible display screen may be a flexible display panel made by PHOLED (Phosphorescent OLED) technology, and hardware components formed on the flexible substrate (such as battery, processor and memory) have been subject to flexibility treatment. The manufacturing process of the flexible display device is not limited in embodiments of the disclosure.

Curvature

Curvature indicates a bending degree of a curved line or a curved surface. The higher the curvature is, the higher the bending degree of the curved line or the curved surface is. As used in embodiments of the disclosure, curvature indicates a bending degree of the flexible display device.

Deformation Sensor

Under the action of an external force (e.g., a pressing force or a pulling force), an object will deform mechanically. A deformation sensor is a sensor for measuring a degree of mechanical deformation of an object. Typical deformation sensors include piezoelectric sensors, resistance strain sensors and the like.

Rigidness

In contrast to flexibility, rigidness indicates the ability of a structure (or a material) to resist deformation when an external force is applied thereto and characterizes the difficulty for the structure (or material) to deform. The higher the rigidness is, the more difficult it is for the structure to deform.

FIG. 1 is a flowchart of a widget displaying method according to an exemplary embodiment. The widget displaying method is used in a flexible display device, and comprises the following steps.

In step 101, pressure bearing capacity information of the flexible display device is acquired, the pressure bearing capacity information indicating pressure bearing capacities of a plurality of areas on the flexible display device.

Optionally, the pressure bearing capacities are related to a held state of the flexible display device or to rigidness of the plurality of areas on the flexible display device.

Optionally, when the pressure bearing capacities are related to the held state of the flexible display device, the pressure bearing capacity information includes information on a held area on the flexible display device held by a holding object.

Optionally, when the pressure bearing capacities are related to the rigidness of the plurality of areas on the flexible display device, the pressure bearing capacity information includes rigidness and distribution of physical components within the flexible display device.

In step 102, a force bearing area on the flexible display screen is determined based on the pressure bearing capacity information.

Here, the force bearing area refers to an area with a high anti-deformation capacity and a high pressure bearing capacity. As compared with a non-force bearing area, a forcing acting area has a higher anti-deformation capacity and a higher pressure bearing capacity.

Considering that, when the flexible display device is in a held state, a touch area where a holding object touches the flexible display device will deform and that, being supported by the holding object, the deformed area has a high anti-deformation capacity and a high pressure bearing capacity, the flexible display device determines a force bearing area with a high anti-deformation capacity and a high pressure bearing capacity on the flexible display screen based on the held state of the flexible display device.

Due to limitation in manufacturing processes, different physical components in the flexible display device have different rigidness. Typically, a physical component with a high rigidness has a high anti-deformation and pressure bearing capacity, and a physical component with a low rigidness has a low anti-deformation capacity and a low pressure bearing capacity. In view of these, the flexible display device can determine a force bearing area with a high anti-deformation capacity and a high pressure bearing capacity on the flexible display screen, based on rigidness and distribution of its internal physical components.

In step 103, a touchable widget is displayed based on the force bearing area.

After the force bearing area on the flexible display screen is determined, the flexible display device displays a touchable widget based on the force bearing area.

Optionally, the flexible display device displays the touchable widget by superposing a graphic layer. That is, the flexible display device superposes a graphic layer upon currently displayed contents on the force bearing area, and displays the touchable widget in the graphic layer. Optionally, in order to avoid blocking the currently displayed contents, the graphic layer and the touchable widget in the graphic layer are set to be translucent.

In summary, with the widget displaying method according to the embodiment, pressure bearing capacity information of a flexible display device is acquired, so that a force bearing area with a high pressure bearing capacity on the flexible display screen is determined according to pressure bearing capacities of areas on the flexible display device indicated by the pressure bearing capacity information; and a touchable widget is displayed based on the force bearing area, thereby ensuring that a user can stably operate the touchable widget within the force bearing area. As such, it addresses the problem that a flexible display device bends under the action of gravity which makes touch operations on the flexible display screen difficult, and achieves the effect that a touchable widget is displayed on an area with a high pressure bearing capacity, thereby ensuring the stability in performing touch operations on the flexible display device and improving success rate and accuracy of the touch operations.

In practical application, when the flexible display device is held by a holding object, the flexible display screen will deform at areas around the held area. Furthermore, being supported by the holding object, the deformed areas have high anti-deformation capacities and high pressure bearing capacities. For example, when a user holds an edge of the flexile display device with one hand, a convex area (or a concave area) which has a high anti-deformation capacity and a high pressure bearing capacity will be at the edge of the flexible display device. Therefore, the flexible display device may determine a force bearing area on the flexible display screen, based on deformation of the flexible display screen at areas around the held area. In the following, an exemplary embodiment will be given for illustration.

FIG. 2A is a flowchart of a widget displaying method according to an exemplary embodiment. The widget displaying method is used in a flexible display device, and comprises the following steps.

In step 201, pressure bearing capacity information of the flexible display device is acquired, the pressure bearing capacity information including information on a held area on the flexible display device held by a holding object.

The flexible display device has a number of sensors. When the flexible display device is held by the holding object, corresponding sensor data can be collected by one or more sensors at the held area, and a processor of the flexible display device can locate the held area based on the sensor data.

In a possible implementation, capacitive sensors are formed on a front face of a flexible display screen of the flexible display device. When the flexible display device is in a held state, one or more capacitive sensors at a touch area where the holding object touches the front face of the flexible display screen can collect capacitance data. Pressure sensors are formed on a rear face of the flexible display screen (opposite to the front face of the flexible display screen). When the flexible display device is in a held state, one or more pressure sensors at a touch area where the holding object touches the rear face of the flexible display screen can collect pressure data. Correspondingly, the processor of the flexible display device can determine the position of the held area, which is held by the holding object, on the flexible display device based on the capacitance data and the pressure data.

Figure 2B:
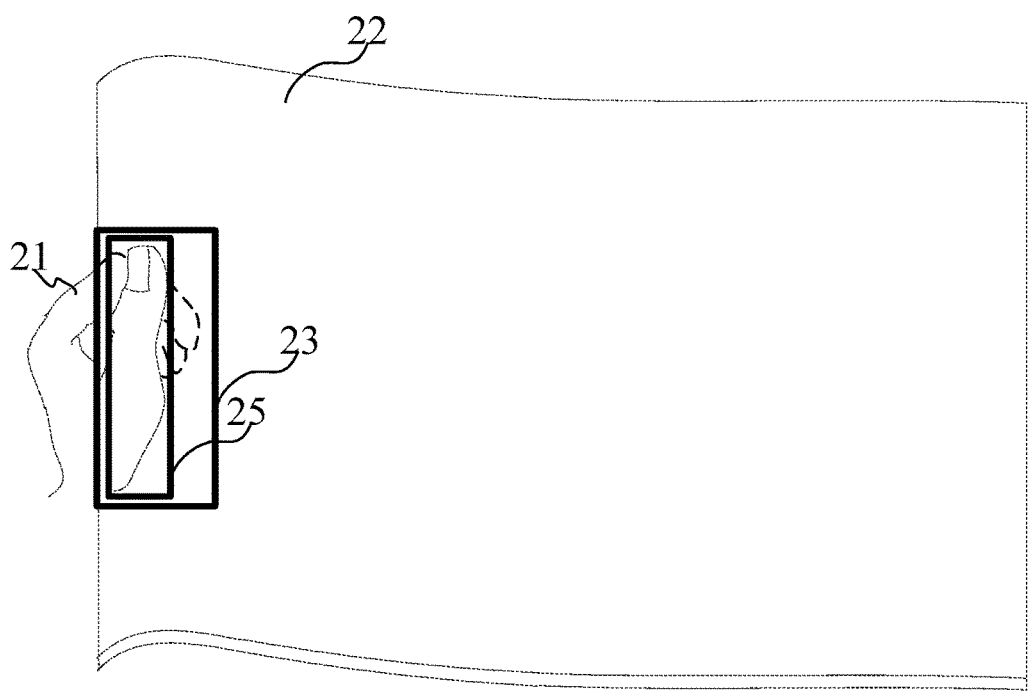
FIG. 2B is a schematic diagram illustrating that a flexible display device is held by a holding hand.

For example, as shown in FIG. 2B where the holding object is exemplified by a holding hand 21, a thumb of the holding hand 21 (denoted by solid line) touches a front face of a flexible display screen, and other fingers of the holding hand 21 (denoted by dashed line) touch a rear face of the flexible display screen. As a result, a raised held area 23 is formed.

In step 202, information or position of the held area on the flexible display device held by the holding object is acquired based on the pressure bearing capacity information, the held area being a touch area where the holding object touches the flexible display device.

After the flexible display device acquires the pressure bearing capacity information, it determines position of the held area on the flexible display device held by the holding object, based on information on the held area included in the pressure bearing capacity information.

Optionally, taking an example where the holding object is a holding hand, the held area includes a touch area where the holding hand (in most cases, a thumb of the holding hand) touches a front face of the flexible display screen and another touch area where the holding hand touches a rear face of the flexible display screen.

After acquiring the position of the held area, the flexible display device determines a force bearing area on the flexible display screen based on the held area, according to the following steps 203 to 204.

In step 203, curvatures of deformed areas around the held area are acquired, the curvatures indicating deformations of the deformed areas.

When the flexible display device is in a held state, areas around the held area will deform. The deformation is often manifested in such a manner that the flexible display screen around the held area bends to form a strip ridge or depression. After determining the held area corresponding to the holding object, the flexible display device acquires curvatures of the flexible display screen around the held area, and then determines deformations of a plurality of areas on the flexible display screen based on the curvatures.

Figure 2C:
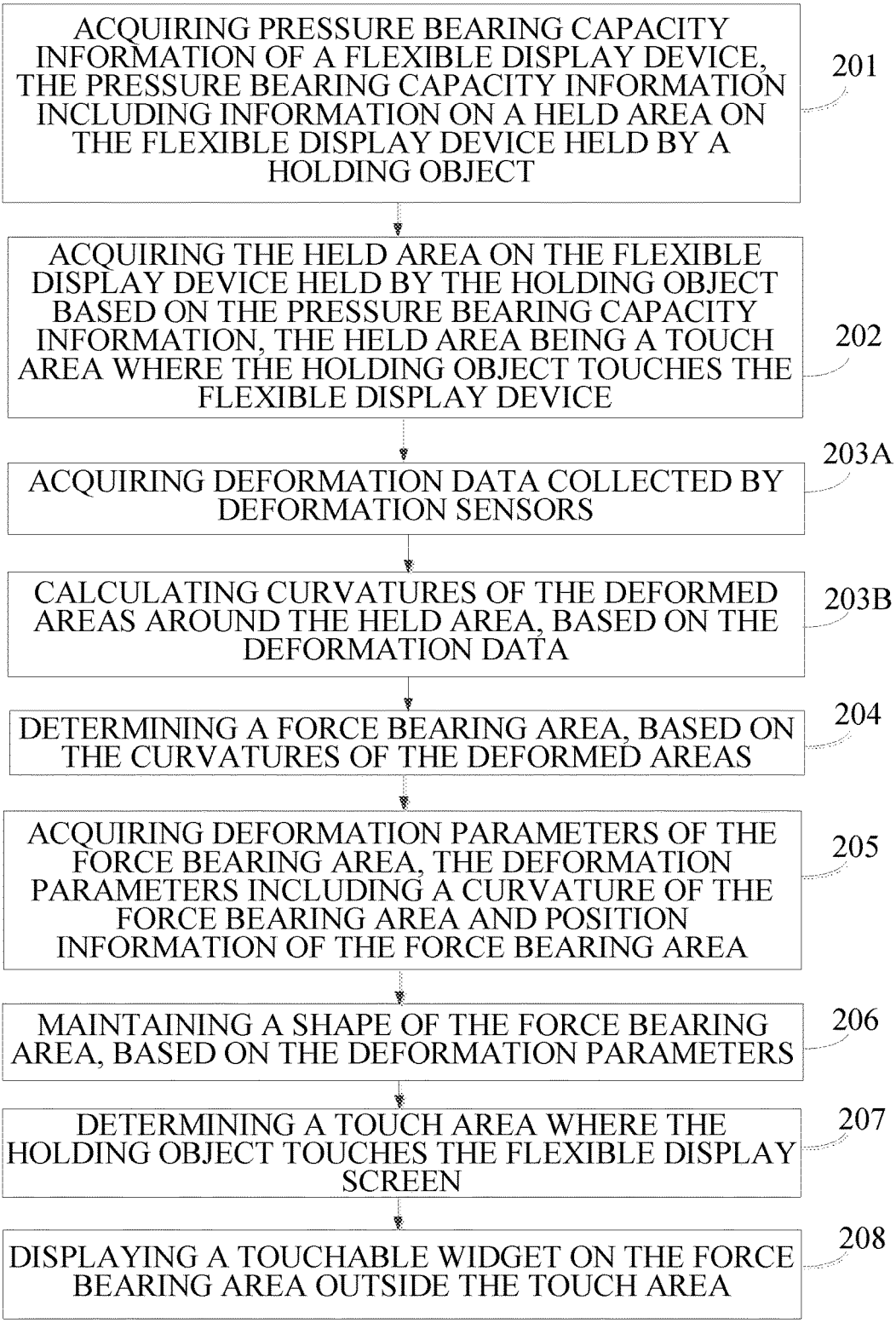
FIG. 2C is a flowchart of a widget displaying method according to yet another exemplary embodiment.

In an implementation, deformation sensors are formed in the flexible display device to collect deformation data of the flexible display device. When the flexible display device deforms, the deformation sensors at the deformed areas collect corresponding deformation data, and report the same to the processor, which calculates curvatures of the deformed areas based on the deformation data. As shown in FIG. 2C, the step 203 may comprise the following steps.

In step 203A, deformation data collected by the deformation sensors is acquired.

The flexible display device has several deformation sensors, and stores sensor coordinates corresponding to the deformation sensors. When the flexible display device is held by a holding object, deformation sensors at the held area collect corresponding deformation data.

Optionally, because a non-held area on the flexible display device is also subject to tiny deformation, deformation data may also be collected by the deformation sensors at the non-held area. To avoid interference of the deformation data at the non-held area, the flexible display device filters out deformation data at the non-held area, based on coordinates of deformation sensors around the held area. That is, the flexible display device merely receives deformation data collected by deformation sensors around the held area.

Figure 2D:
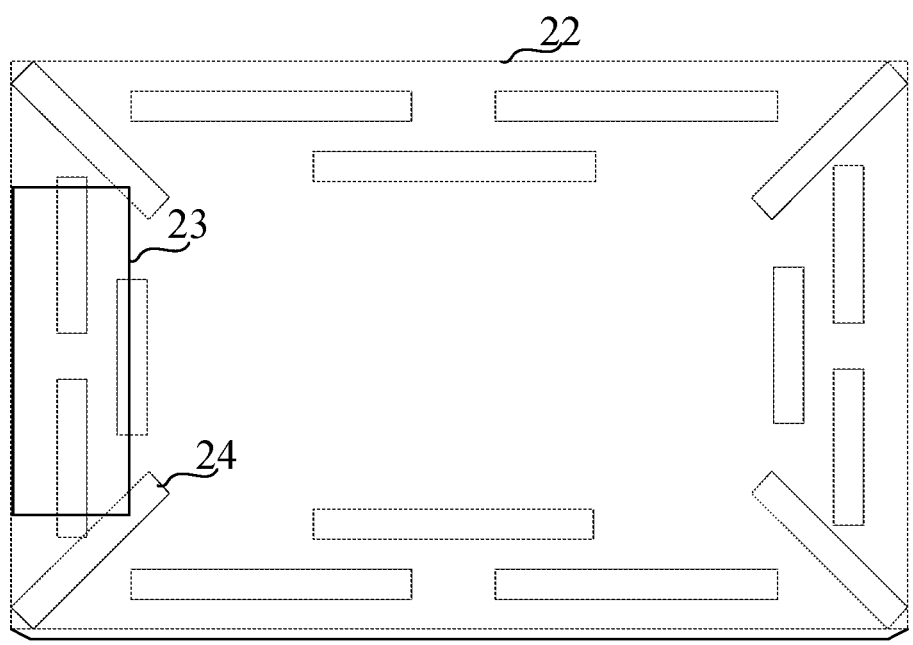
FIG. 2D is a schematic diagram of deformation sensors in a flexible display device.

For example, as shown in FIG. 2D, the flexible display device 22 has several deformation sensors 24 (such as film piezoelectric sensors). When in a held state, the flexible display device acquires deformation data collected by deformation sensors 24 around a held area 23.

It should be noted that, in this embodiment, the above-mentioned layout of deformation sensors is merely an example for illustrative purpose. In other implementations, deformation sensors in the flexible display device may be distributed in an array, which is not limited in the embodiment.

In step 203B, curvatures of the deformed areas around the held area are calculated based on the deformation data.

The flexible display device calculates curvatures of the deformed areas around the held area based on the acquired deformation data, so as to determine deformations of different areas on the flexible display screen based on the curvatures.

In an implementation, the flexible display device performs modeling based on coordinates of deformation sensors in order to obtain a virtual model of the flexible display device, simulates in the virtual model deformation of the flexible display screen based on the deformation data collected by the deformation sensors, and calculates the curvatures of the deformed areas around the held area. The specific manner for calculating the curvature of the flexible display screen is not limited in the disclosure.

In step 204, a force bearing area is determined based on the curvatures of the deformed areas.

When the flexible display screen is in a held state, if a deformed area on the flexible display screen has a higher curvature, it indicates that the deformed area is nearer to the holding object. Correspondingly, being supported by the holding object, the deformed area can bear a greater pressure. Therefore, after calculating the curvatures of the deformed areas around the held area according to the above step 203, the flexible display device determines a deformed area whose curvature is higher than a first curvature threshold as a force bearing area. Typically, the force bearing area is larger than or equal to the held area.

In an implementation, the step comprises the following sub-steps.

At sub-step 1, it is detected whether the curvatures of the deformed areas are greater than a first curvature threshold, in an ascending order of respective distances between the deformed areas and the held area.

Because deformation of a deformed area on the flexible display screen is related to a distance between the deformed area and the holding object (specifically, the shorter the distance between the deformed area and the holding object is, the greater the deformation of the deformed area is; and the longer the distance between the deformed area and the holding object is, the smaller the deformation of the deformed area is), the flexible display device detects whether the curvatures of the deformed areas are greater than a first curvature threshold, in an ascending order of respective distances between the deformed areas and the held area.

At sub-step 2, when it is detected that the curvature of one of the deformed areas is smaller than the first curvature threshold, detection, for any farther deformed area, whether its curvature is greater than the first curvature threshold is stopped.

Because the curvature of a deformed area gets smaller as the distance between the deformed area and the holding object increases, the flexible display device stops curvature detection for any farther deformed area, when detecting that the curvature of one of the deformed areas is smaller than the first curvature threshold.

At sub-step 3, one or more deformed areas on the flexible display screen whose curvature is greater than the first curvature threshold is determined as the force bearing area.

Correspondingly, the flexible display device determines the deformed areas for which detection is performed before stopping the detection (and thus whose curvature is greater than the first curvature) as the force bearing area.

It should be noted that, when the held area changes or when a part or an entirety of the flexible display device is placed on a flat supporting object, the pressure bearing capacity information of the flexible display device will change accordingly. Correspondingly, the flexible display device needs to dynamically determine the force bearing area according to the changing pressure bearing capacity information. For example, when a part or an entirety of the flexible display device is placed on a table surface, the flexible display device will determine its touch area with the table surface as the force bearing area and displays a touchable widget based on the force bearing area. However, the disclosure is not limited thereto.

In step 205, deformation parameters of the force bearing area are acquired, the deformation parameters including a curvature of the force bearing area and position information of the force bearing area.

For a flexible display device having a deformation control function, in order to further improve the stability in performing touch operations on a force bearing area, the flexible display device maintains a shape of the force bearing area so that the forcing bearing area has a higher anti-deformation capacity and a higher pressure bearing capacity, after determining the force bearing area on the flexible display screen.

In an implementation, after determining the force bearing area on the flexible display screen, the flexible display device further acquires deformation parameters of the force bearing area and provides the deformation parameters to a deformation control module as input data. The deformation control module maintains the shape of the force bearing area based on the deformation parameters. The deformation control module refers to a program module for controlling deformation in the flexible display device. The deformation parameters include a curvature of the force bearing area and position information of the force bearing area.

In step 206, a shape of the force bearing area is maintained, based on the deformation parameters.

In an implementation, the flexible display device determines the position of the force bearing area according to the position information included in the deformation parameters, and increases a voltage or current at the force bearing area according to the curvature included in the deformation parameters so as to maintain the shape of the force bearing area. Alternatively, the flexible display device may maintain the shape of the force bearing area by increasing the temperature of the force bearing area.

In another implementation, the flexible display device may maintain the shape of the force bearing area by changing the mechanical structure of the force bearing area. In the disclosure, the manner for maintaining the shape of the force bearing area is not limited.

It should be noted that, when the flexible display device has no deformation control function, the flexible display device may skip the above steps 205 and 206.

In step 207, a touch area where the holding object touches the flexible display screen is determined.

When the flexible display device is in a held state, the holding object touches part of the force bearing area of the flexible display screen. If a touchable widget is displayed on the touch area, the user's normal operation will be affected and even misoperation may occur. Therefore, after determining the force bearing area, the flexible display device further determines the touch area where the holding object touches the flexible display area, instead of directly displaying the touchable widget in the force bearing area.

In an implementation, the flexible display device determines the touch area where the holding object touches the flexible display screen by utilizing a multi-touch function of the flexible display screen.

For example, as shown in FIG. 2B, the flexible display device 22 determines a touch area 25 where the holding hand 21 touches the flexible display screen.

In step 208, a touchable widget is displayed on the force bearing area outside the touch area.

After determining the force bearing area and the touch area, the flexible display device displays a corresponding touchable widget on the force bearing area outside the touch area, according to contents currently displayed on the flexible display screen. Optionally, the touchable widget includes a touchable button, a slidable progress bar or the like.

It should be noted that, when displaying a touchable widget, the flexible display device may also scale the touchable widget according to the size of the force bearing area (except the touch area), so as to achieve a better display effect for the touchable widget.

The flexible display device receives a touch signal via the touchable widget, and performs a corresponding operation according to the touch signal.

Figure 2E:
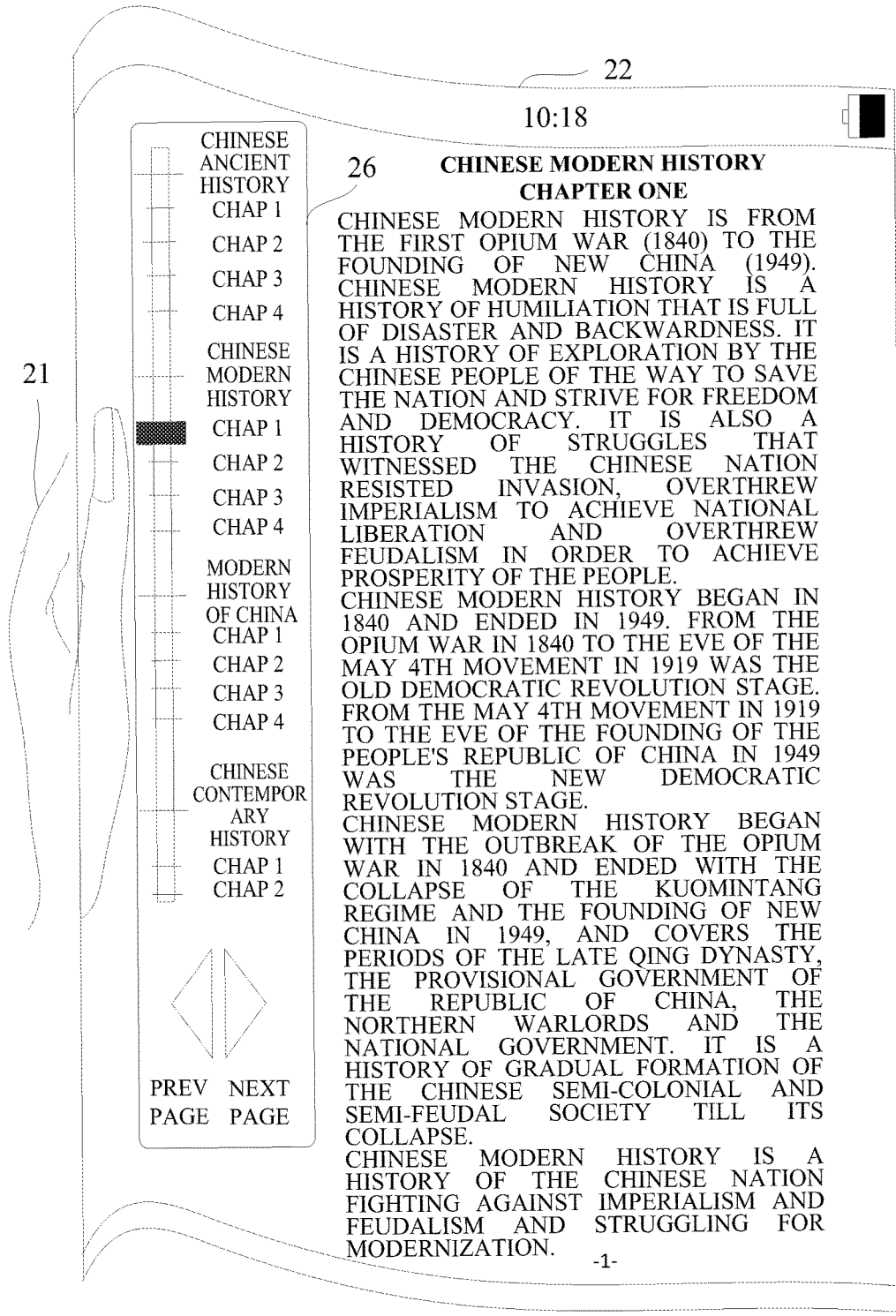
FIG. 2E is a schematic diagram of a touchable widget displaying manner according to an exemplary embodiment.

For example, as shown in FIG. 2E, when a flexible display device 22 is held by a holding hand 21, a strip ridge is formed at an edge of a flexible display device 22. The flexible display device 22 determines a force bearing area based on a held area of the flexible display device 22 held by the holding hand 21, and displays a touchable widget 26 on the force bearing area outside the touch area where the holding hand 21 touches the flexible display area.

Figure 2F:
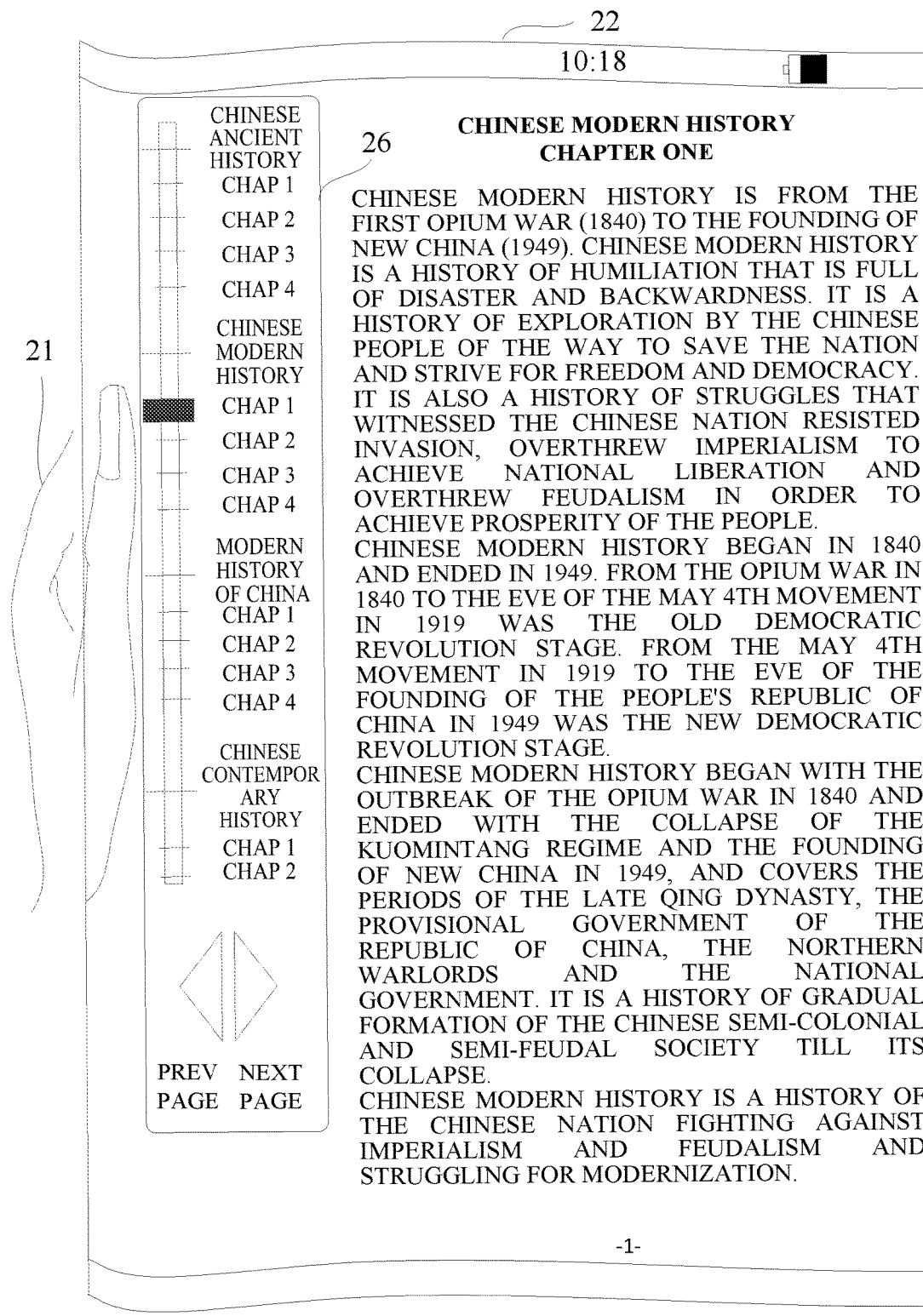
FIG. 2F is a schematic diagram of a touchable widget displaying manner according to another exemplary embodiment.

As another example, as shown in FIG. 2F, when a flexible display device 22 is held by a holding hand 21, a strip valley is formed at an edge of the flexible display device 22. The flexible display device 22 determines a force bearing area based on a held area of the flexible display device 22 held by the holding hand 21, and displays a touchable widget 26 on the force bearing area outside the touch area between the holding hand 21 and the flexible display area.

In conclusion, in the widget displaying method according to the embodiment, the flexible display device acquires a position of a held area on the flexible display device held by a holding object, determines a force bearing area on the flexible display screen based on the held area and then displays a touchable widget based on the force bearing area, taking into account that the flexible display screen has a higher anti-deformation capacity and a higher pressure bearing capacity at the held area. As such, the method addresses the problem that the flexible display device bends under the action of gravity which makes touch operations on the flexible display screen difficult, and achieves the effect that a force bearing area on the flexible display screen with a higher pressure bearing capacity is determined dynamically according to a held state of the flexible display device and is used for receiving the user's touch operation, thereby ensuring that the user can stably perform touch operations on the force bearing area and improving success rate and accuracy of the touch operations.

In the embodiment, when having a deformation control function, the flexible display device maintains the shape of the force bearing area according to deformation parameters of the force bearing area, thereby improving the stability of the force bearing area and facilitating the user to perform touch operations on the force bearing area.

In the embodiment, after determining the force bearing area based on the held area on the flexible display device held by the holding object, the flexible display device further determines a touch area where the holding object touches the flexible display screen and displays the touchable widget on the force bearing area outside the touch area, thereby avoiding misoperation caused by the holding object and improving the accuracy of touch operations.

In the embodiment, the flexible display device detects curvatures of deformed areas around the held area in an ascending order of respective distances from the deformed areas to the held area and, when it is detected that the curvature of one of the deformed areas is smaller than a first curvature threshold, stops curvature detection for any farther deformed area, so that there is no need to detect curvatures of all the deformed areas on the flexible display screen in the process of determining the force bearing area, thereby reducing the amount of computation and further improving the efficiency of determining the force bearing area.

Figure 3A:
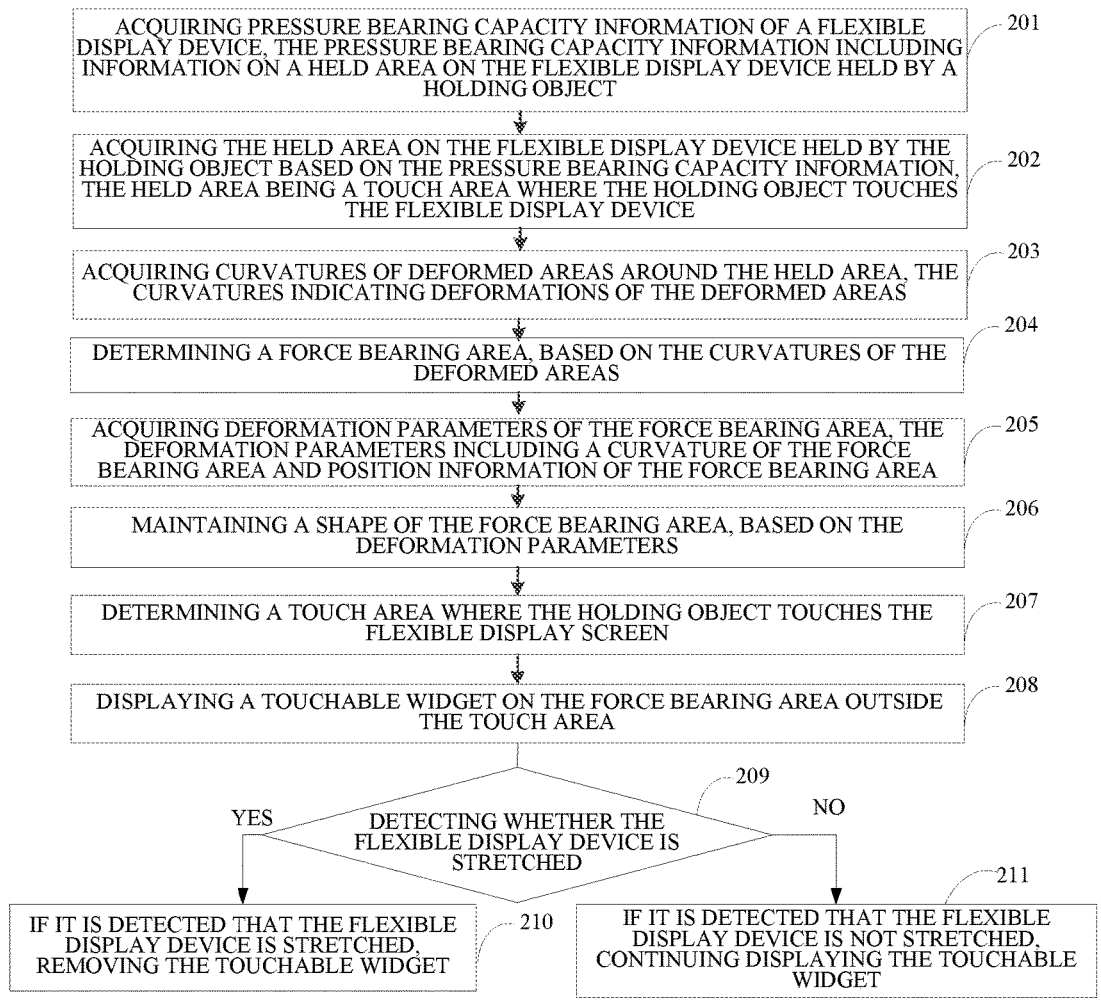
FIG. 3A is a flowchart of a widget displaying method according to still another exemplary embodiment.

In an implementation, after performing a touch operation, the user may instruct the flexible display device to remove the touchable widget, by stretching the flexible display device. As shown in FIG. 3A, further with reference to the embodiment shown in FIG. 2A, the method may further comprise the following steps.

In step 209, it is detected whether the flexible display device is stretched.

Figure 3B:
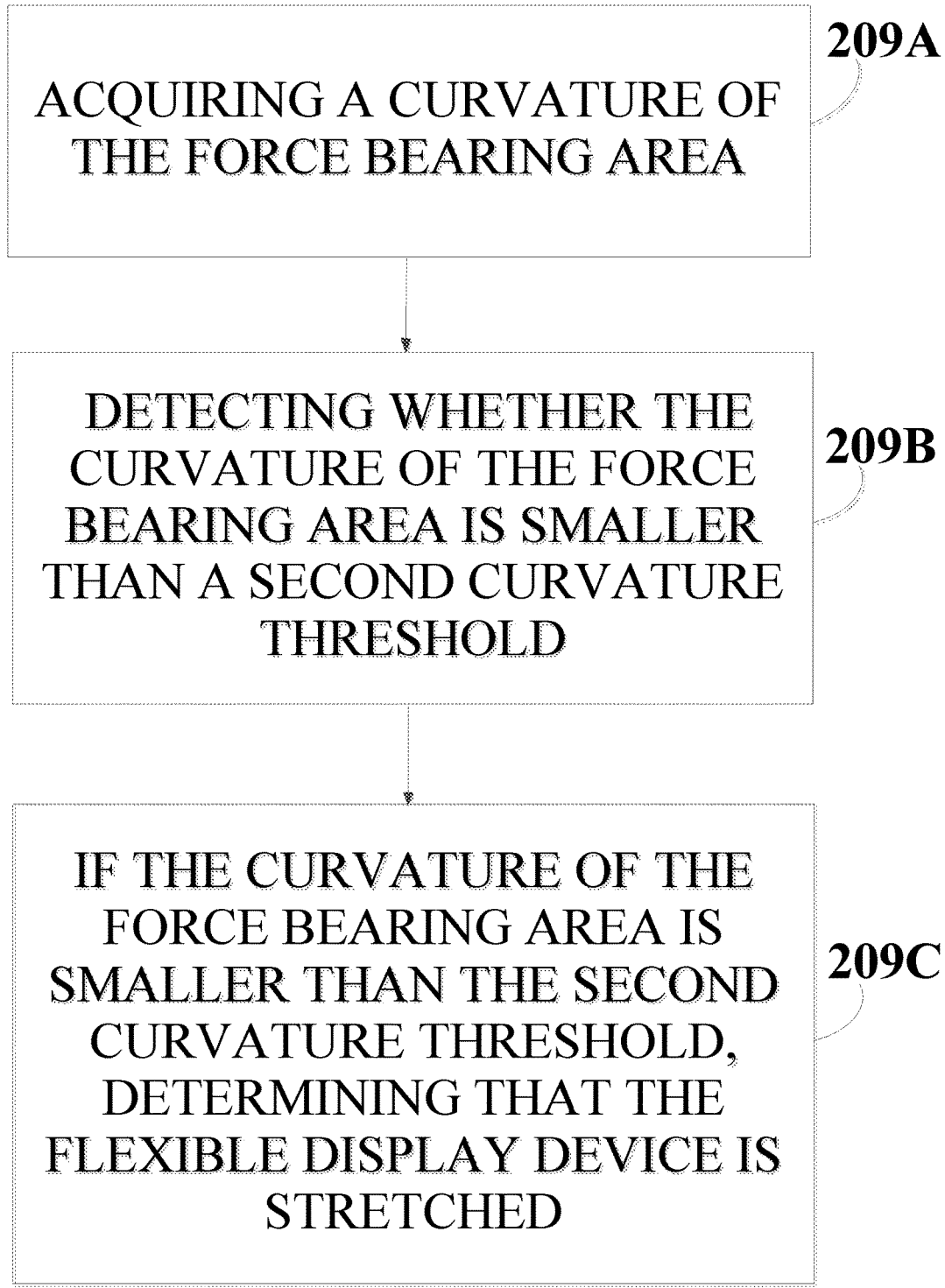
FIG. 3B is a flowchart of a stretch detecting process in the widget displaying method shown in FIG. 3A.

After the touchable widget is displayed by the flexible display device, it is detected whether the flexible display device is stretched, that is, whether the ridge or the valley formed at the force bearing area is removed due to stretch of the device. If it is detected that the flexible display device is stretched, then the touchable widget is removed and step 210 is performed. If it is detected that the flexible display device is not stretched, the touchable widget continues to be displayed and step 211 is performed. Optionally, as shown in FIG. 3B, the step 209 may comprise the following sub-steps.

In sub-step 209A, a curvature of the force bearing area is acquired.

The flexible display device has several deformation sensors, and stores sensor coordinates corresponding to the deformation sensors. After displaying the touchable widget based on the force bearing area, the flexible display device acquires deformation data collected by deformation sensors in the held area.

After acquiring the deformation data collected by the deformation sensors in the held area, the flexible display device calculates a curvature of the force bearing area based on the deformation data.

Optionally, the flexible display device performs modeling based on coordinates of the deformation sensors in order to obtain a virtual model of the flexible display device, simulates in the virtual model deformation of the flexible display screen based on the deformation data collected by the deformation sensors in the force bearing area, and finally calculates the curvature of the force bearing area. The specific manner for calculating the curvature of the flexible display screen is not limited in the disclosure.

In sub-step 209B, it is detected whether the curvature of the force bearing area is smaller than a second curvature threshold.

If the flexible display device is stretched, the deformation of the force bearing area on the flexible display screen decreases and the curvature of the force bearing area decreases accordingly. Therefore, the flexible display device may detect whether it is stretched based on a change in the curvature of the force bearing area.

After acquiring the curvature of the force bearing area, the flexible display device detects whether the curvature of the force bearing area is smaller than a second curvature threshold. If it is detected that the curvature of the force bearing area is smaller than the second curvature threshold, it indicates that the deformation of the force bearing area is small, and the flexible display device determines that it is stretched and performs the following sub-step 209C.

It should be noted that, when detecting that the curvature of the force bearing area is smaller than a third curvature threshold but greater than the second curvature threshold, the flexible display device may cancel maintaining the shape of the force bearing area by decreasing the voltage or current at the force bearing area, so as to facilitate the user to stretch the flexible display device. The first curvature threshold is greater than the third curvature threshold, and the third curvature threshold is greater than the second curvature threshold.

In sub-step 209C, if the curvature of the force bearing area is smaller than the second curvature threshold, it is determined that the flexible display device is stretched.

When it is determined that the flexible display device is stretched, the flexible display device performs the following step 210.

In step 210, if it is detected that the flexible display device is stretched, the touchable widget is removed.

For example, as shown in FIG. 3C, when the user stretches the flexible display device 22 with the holding hand 21, the curvature of the force bearing area decreases and the flexible display device 22 removes the touchable widget 26.

In step 211, if it is detected that the flexible display device is not stretched, the touchable widget continues to be displayed. In the embodiment, the flexible display device determines whether it is stretched based on the change in the curvature of the force bearing area, and stops displaying the touchable widget when the flexible display device is stretched, thereby improving user experience. Furthermore, it can be determined whether the flexible display device is stretched simply by detecting the curvature of the force bearing area. As the detection efficiency is high, the response speed of the flexibly display device is further improved.

Figure 3D:
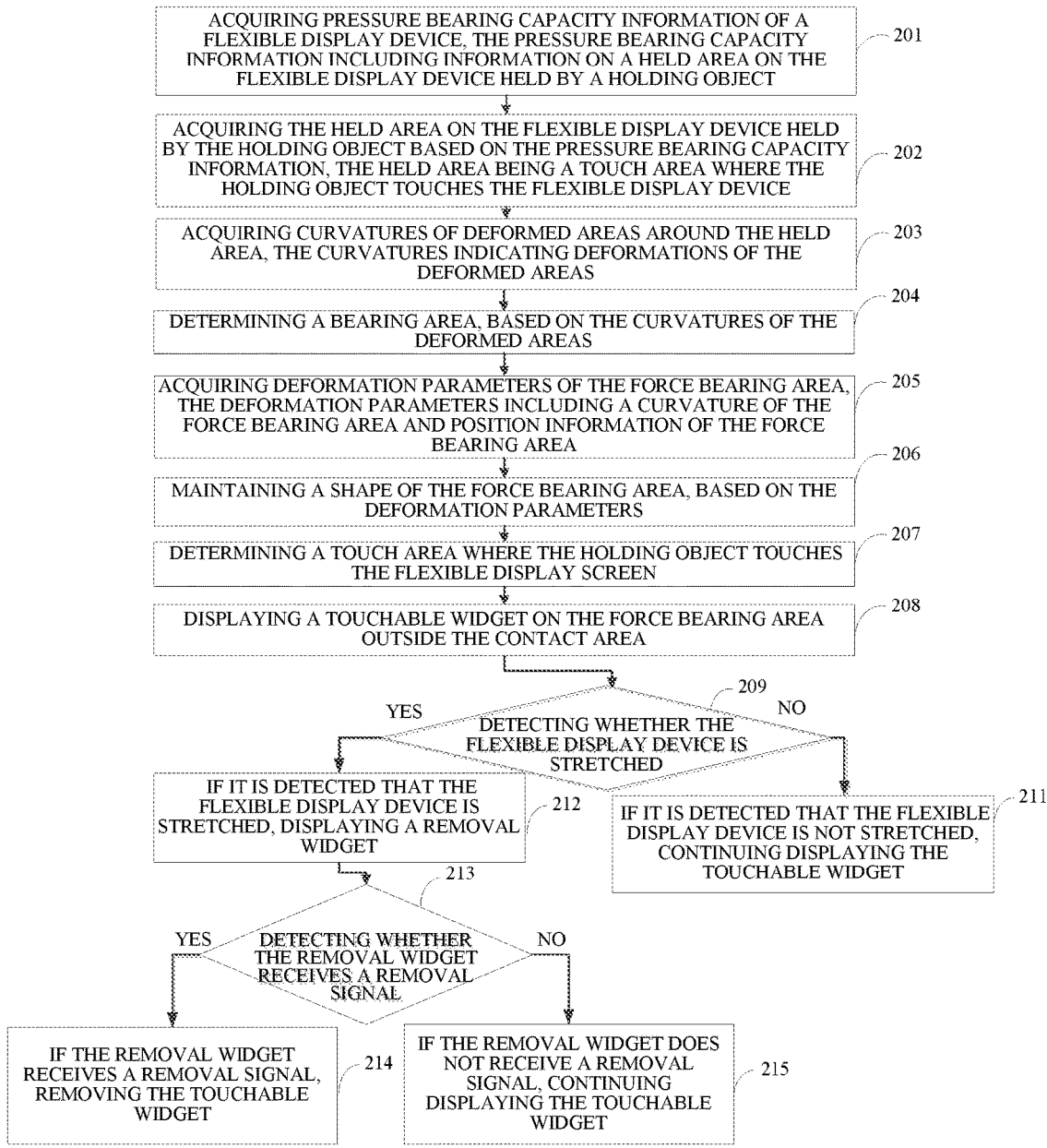
FIG. 3D is a flowchart of a widget displaying method according to a further exemplary embodiment.

In another implementation, to avoid misoperation of the user, the flexible display device displays a removal widget when it is detected that the flexible display device is stretched, and removes the touchable widget on the force bearing area when detecting that the user touches the removal widget. As shown in FIG. 3D, the above step 210 may be replaced by the following steps.

In step 212, if it is detected that the flexible display device is stretched, a removal widget is displayed.

When it is detected that the flexible display device is stretched at the above step 209, the flexible display device displays a removal widget on the display screen. Optionally, the removal widget is displayed around the touchable widget.

For example, as shown in FIG. 3E, when the user stretches the flexible display device 22 with the holding hand 21, the flexible display device 22 displays a removal widget 27 around the touchable widget 26.

In step 213, it is detected whether the removal widget receives a removal signal.

After displaying the removal widget, the flexible display device detects whether the removal widget receives a removal signal, that is, whether the user touches the removal widget. The removal signal is a predetermined touch signal on the removal widget, and may be a single-click signal, a double-click signal or the like.

For example, as shown in FIG. 3E, the flexible display device detects whether the removal widget 27 receives a single-click signal.

In step 214, if the removal widget receives the removal signal, the touchable widget is removed.

When it is desired to remove the touchable widget on the display screen, the user touches the removal widget on the display screen. Correspondingly, when the removal widget receives a removal signal, the corresponding touchable widget is removed.

For example, as shown in FIG. 3E, when the user clicks the removal widget 27 once, the flexible display device 22 removes the touchable widget 26.

In step 215, if the removal widget does not receive the removal signal, the touchable widget continues to be displayed.

If the user does not click the removal widget, the flexible display device continues displaying the touchable widget.

In the embodiment, when the flexible display device is stretched, a corresponding removal widget is displayed on the flexible display screen instead of directly removing the touchable widget, and the touchable widget on the force bearing area is removed when it is detected that the user touches the removal widget, thereby avoiding erroneous removal of the touchable widget due to misoperation of the user.

Due to difference in manufacturing process between different physical components in the flexible display device, different physical components may have different rigidness. Typically, a physical component with a high rigidness has a high anti-deformation and pressure bearing capacity, and a physical component with a low rigidness has a low anti-deformation capacity and a low pressure bearing capacity. In view of these, the flexible display device can determine a force bearing area with a high anti-deformation capacity and a high pressure bearing capacity on the flexible display screen based on rigidness and distribution of its internal physical components, and display a touchable widget based on the force bearing area. In the following, description will be given in an illustrative embodiment.

Figure 4A:
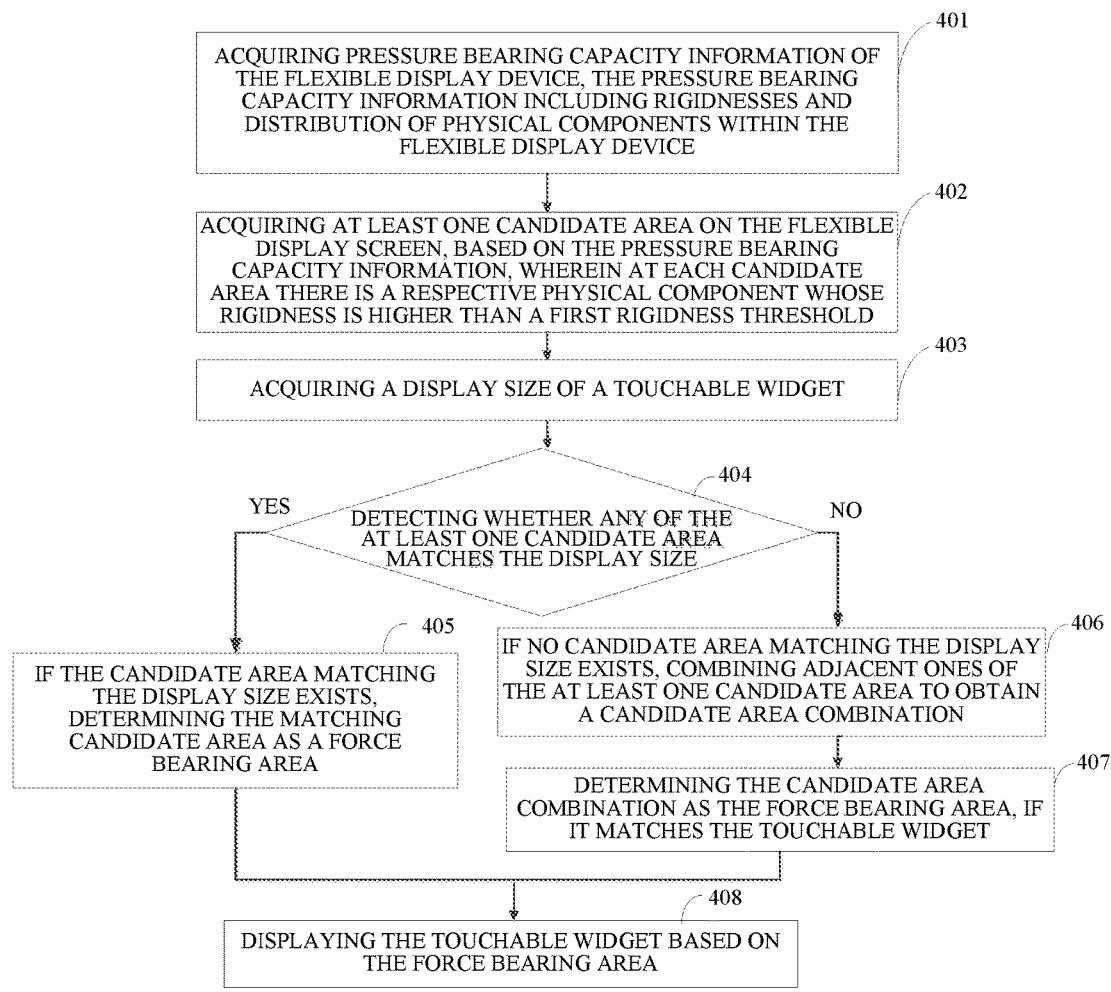
FIG. 4A is a flowchart of a widget displaying method according to yet a further exemplary embodiment.

FIG. 4A is a flowchart of a widget displaying method according to another exemplary embodiment. The method is used in a flexible display device and comprises the following steps.

In step 401, pressure bearing capacity information of the flexible display device is acquired, the pressure bearing capacity information including rigidness and distribution of physical components within the flexible display device.

The flexible display device includes therein a number of physical components, such as a processor, a memory and a battery component. Due to difference in manufacturing processes, different physical components have different rigidness. For example, the processor and the memory have higher rigidness, while the battery component has a lower rigidness. A physical component with a lower rigidness can bear a smaller pressure and is subject to a higher degree of deformation under pressure, while another physical component with a higher rigidness can bear a greater pressure and is subject to a lower degree of deformation under pressure.

The flexible display device pre-stores therein rigidness and distribution of physical components. When it is desired to determine a force bearing area for displaying a touchable widget based on the rigidness of the physical components, the flexible display device acquires the rigidness and distribution of the physical components.

In step 402, information of at least one candidate area on the flexible display screen is acquired, based on the pressure bearing capacity information. At each candidate area, there is a respective physical component whose rigidness is higher than a first rigidness threshold.

After acquiring the pressure bearing capacity information indicating the rigidness and distribution of the physical components, the flexible display device determines at least one candidate area on the flexible display screen based on the pressure bearing capacity information. Each candidate area corresponds to a physical component, and the rigidness of the physical component at the candidate area is greater than a first rigidness threshold.

Figure 4B:
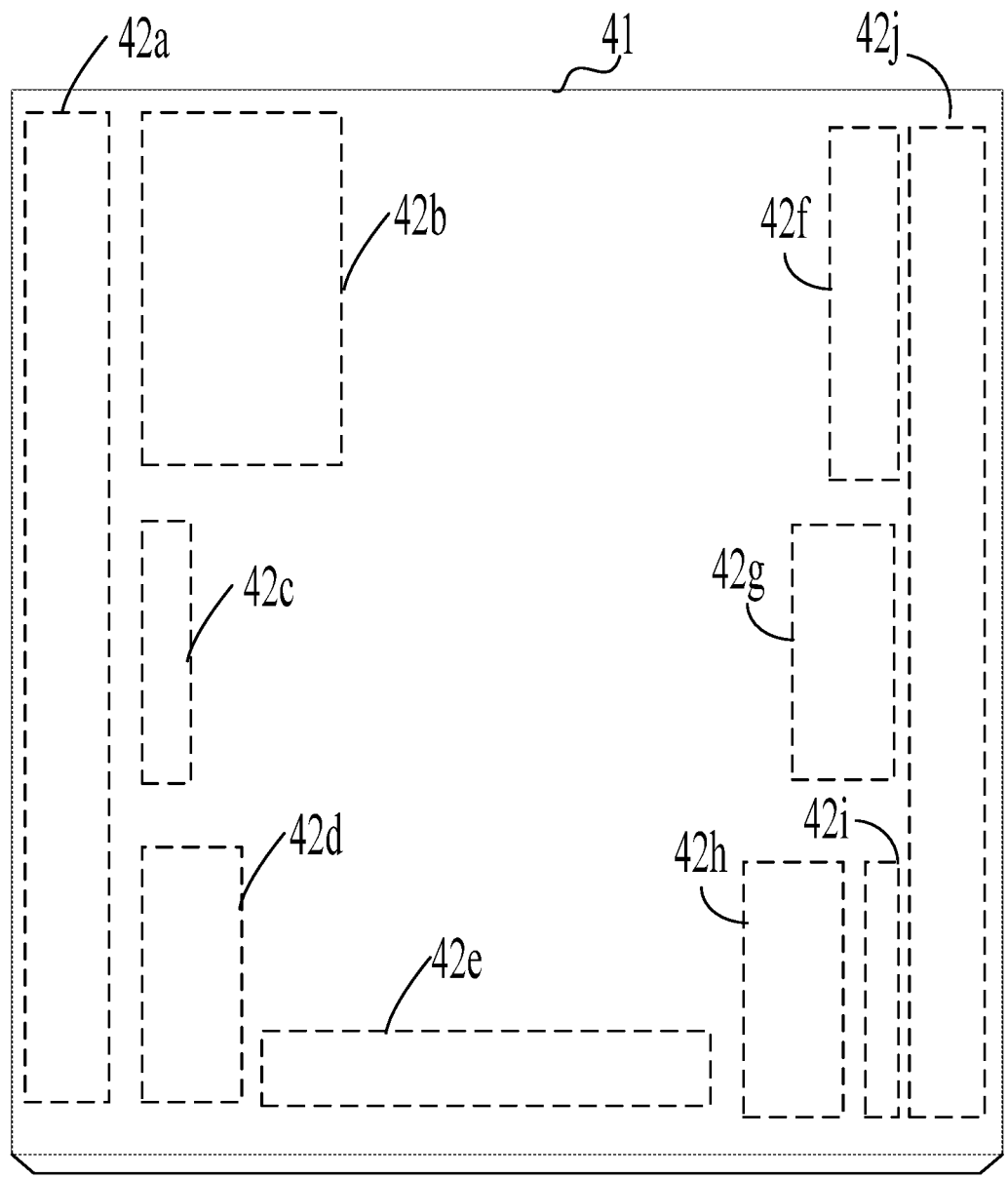
FIG. 4B is a schematic diagram of candidate display areas on a flexible display device.

For example, as shown in FIG. 4B, the flexible display device determines 10 candidate areas (denoted by dashed line blocks), which are respectively numbered 42a to 42j, on the flexible display screen 41, based on the pressure bearing capacity information.

After acquiring information at least one candidate area on the flexible display screen, the flexible display device determines a force bearing area for displaying a touchable widget according to the following steps 403 to 407.

In step 403, a display size of the touchable widget is acquired.

In different application scenarios, touchable widgets to be displayed in the flexible display screen are of different types. Accordingly, the touchable widgets have different sizes for display. For example, in a reader client, touchable widgets to be displayed include a chapter selection and page flipping widget which has a display size of 50 px×250 px; while in a video player client, touchable widgets to be displayed include a progress bar and volume adjusting widget which has a display size of 450 px×50 px.

When determining the force bearing area, the flexible display device acquires a display size of a touchable widget to be displayed.

For example, the flexible display device acquires the display size of the touchable widget to be displayed as 50 px×250 px.

In step 404, it is detected whether any of the candidate areas matches the display.

After acquiring the display size of the touchable widget, the flexible display device acquires sizes corresponding to the candidate areas and detects, based on the sizes, whether any of the candidate areas matches the touchable area. If there is a candidate area matching the touchable area, step 405 is executed; otherwise, step 406 is executed.

In an implementation, the flexible display device pre-stores therein the sizes corresponding to the candidate areas. Such correspondence relationships are illustratively shown in Table 1.

TABLE 1

| Candidate area number | Size (length × width, unit: px) |
|---|---|
| 1 | 45 × 260 |
| 2 | 100 × 100 |
| ... | ... |
| 9 | 20 × 80 |
| 10 | 43 × 260 |

After acquiring the sizes of the candidate areas, the flexible display device calculates a degree of length match (which is equal to or smaller than 1) and a degree of width match (which is also equal to or smaller than 1) between each candidate area and the touchable widget so as to calculate a degree of size match between the candidate area and the touchable widget based on the degree of length match and the degree of width match, and determines a candidate display area whose degree of size match is greater than a predetermined threshold as a matching candidate area.

For example, if the display size of the touchable widget is 50×250 and the size of a candidate area 1 is 45×260, then the degree of length match between the touchable widget and the candidate area 1 is 45÷50=0.9, the degree of width match therebetween is 250÷260=0.962, and the degree of size match therebetween is 0.9×0.963=0.8658.

It should be noted that, when the size of a candidate area is larger than the size of the display area of the touchable widget, the flexible display device may directly determine the candidate display area as a matching area, without calculating a degree of size match therebetween according to the above steps.

In step 405, if the candidate area matching the display size exists, the matching candidate area is determined as a force bearing area.

If it is detected that there is a candidate display area matching the touchable widget, the flexible display device determines the matching candidate display area as the force bearing area.

Optionally, if there are multiple matching candidate areas, the flexible display device determines the candidate area with the highest degree of match as the force bearing area.

In step 406, if no candidate area matching the display size exists, adjacent ones of the at least one candidate area are combined to obtain a candidate area combination.

If it is detected that no candidate area matching the touchable widget exists (that is, displaying the touchable widget on any single candidate area will result in an undesirable visual effect), the flexible display device combines adjacent candidate areas to obtain a candidate area combination.

Optionally, when combining adjacent candidate areas, the flexible display device calculates a degree of combination for the adjacent candidate areas, and determines based on the degree of combination whether the adjacent candidate area can be combined.

In an implementation, the step may comprise the following sub-steps.

In sub-step 1, a degree of combination is calculated for adjacent ones of the at least one candidate area, the degree of combination relating to distances between the adjacent candidate areas and rigidness of physical components corresponding to the adjacent candidate areas.

Optionally, the flexible display device stores location information of candidate areas. Thus, the flexible display device calculates distances between each two of the adjacent candidate areas according to the location information and determines a first degree of combination based on the distances. Further, the flexible display device calculates a similarity of rigidness between the adjacent candidate areas based on rigidness of physical components corresponding to the candidate areas, and determines a second degree of combination based on the similarity of rigidness. After determining the first degree of combination and the second degree of combination, the flexible display device determines a degree of combination between the adjacent candidate areas based on the first degree of combination and the second degree of combination. For example, the flexible display device calculates the degree of combination between the adjacent candidate areas as 0.9.

In another implementation, if a distance between two adjacent candidate areas is greater than a predetermined distance threshold, the flexible display device determines that these two candidate areas cannot be combined. If the distance is smaller than the predetermined distance threshold, the flexible display device further calculates a similarity of rigidness between physical components corresponding to the candidate areas. If the similarity of rigidness is greater than a predetermined similarity threshold, then it is determined that the two candidate areas can be combined. If the similarity of rigidness is smaller than the predetermined similarity threshold, then it is determined that the two candidate areas cannot be combined.

In sub-step 2, the adjacent candidate areas are combined to obtain the candidate area combination, if the degree of combination is greater than a predetermined combination degree threshold.

After calculating more than one degrees of combination for more than one groups of adjacent candidate areas, the flexible display device combines group(s) of adjacent candidate areas whose degree(s) of combination is(are) greater than a predetermined combination degree threshold, so as to obtain a number of candidate area combinations. For example, the predetermined combination degree threshold is 0.85.

For example, as shown in FIG. 4B, the degree of combination for a candidate area 42b and a candidate area 42f is smaller than the predetermined combination degree threshold (because the distance therebeween is too large), so the candidate areas 42b and 42f cannot be combined. The degree of combination for a candidate area 42d and a candidate area 42e is greater than the predetermined combination degree threshold and the degree of combination for the candidate area 42e and a candidate area 42h is greater than the predetermined combination degree threshold, so the candidate areas 42d, 42e and 42h can be combined.

In step 407, the candidate area combination is determined as the force bearing area, if it matches the touchable widget.

After determining a number of candidate area combinations, the flexible display device determines therefrom a candidate area combination that matches the touchable widget as the force bearing area. Optionally, the step comprises the following sub-steps.

In sub-step 1, the candidate area combination is scored, according to at least one scoring criteria.

The at least one scoring criteria include at least one of the following: an average rigidness of the candidate area combination, a degree of match between the candidate area combination and the display size, and a distance between the candidate area combination and the held area held by the holding object.

In an implementation, the flexible display device calculates an average rigidness based on rigidness of physical components corresponding to candidate areas in a candidate area combination, and obtains a first sub-score corresponding to the average rigidness according to a predetermined scoring criterion. The flexible display device calculates a degree of size match based on the size of the candidate area combination and the display size of the touchable widget, and obtains a second sub-score corresponding to the degree of size match according to a predetermined scoring criterion. The flexible display device acquires a position of the held area held by the holding object, calculates a distance between the position and the location of the candidate area combination, and obtains a third sub-score corresponding to the distance according to a predetermined scoring criterion. Finally, the flexible display device calculates a score of the candidate area combination, according to the first, second and third sub-scores and their respective scoring weights.

For example, supposing that the flexible display device calculates a first sub-score as 0.9, a second sub-score as 0.85 and a third sub-score as 0.7 and that the weight corresponding to the first sub-score is 20% and the weights corresponding to the second and third sub-scores are each 40%, then the score of the candidate area combination is 0.9*0.2+ 0.85*0.4+0.7*0.4=0.8.

In sub-step 2, a candidate area combination with its score greater than a predetermined score threshold is determined as matching the touchable widget.

After calculating scores of the candidate area combinations, the flexible display device determines a candidate area combination whose score is higher than the predetermined score threshold as matching the touchable widget. For example, the predetermined score threshold is 0.8.

In step 408, the touchable widget is displayed based on the force bearing area.

After determining the force bearing area, the flexible display device displays the touchable widget based on the force bearing area.

Optionally, the flexible display device displays the touchable widget by superposing a graphic layer (upon contents currently displayed on the force bearing area) and displaying the touchable widget in the graphic layer.

Optionally, when displaying the touchable widget, the flexible display device needs to scale the touchable widget according to the size of the force bearing area, because the size of the force bearing area may not be completely consistent with the display size of the touchable widget.

Optionally, because it is not the entire touchable widget that needs to receive the user's touch operation (for example, a part of the touchable widget for displaying a numerical value does need to receive the user's touch operation), when displaying the touchable widget the flexible display device displays a part of the touchable widget for receiving the user's touch operation within the force bearing area and displays a part of the touchable widget which does not need to be touched by the user (namely, the part dedicated for the purpose of displaying) around the force bearing area.

Optionally, to avoid misoperation by the holding hand of the user, the flexible display device needs to further determine a touch area where the holding hand touches the flexible display screen. When the force bearing area includes the touch area, the flexible display device displays the touchable widget on the force bearing area outside the touch area.

Figure 4C:
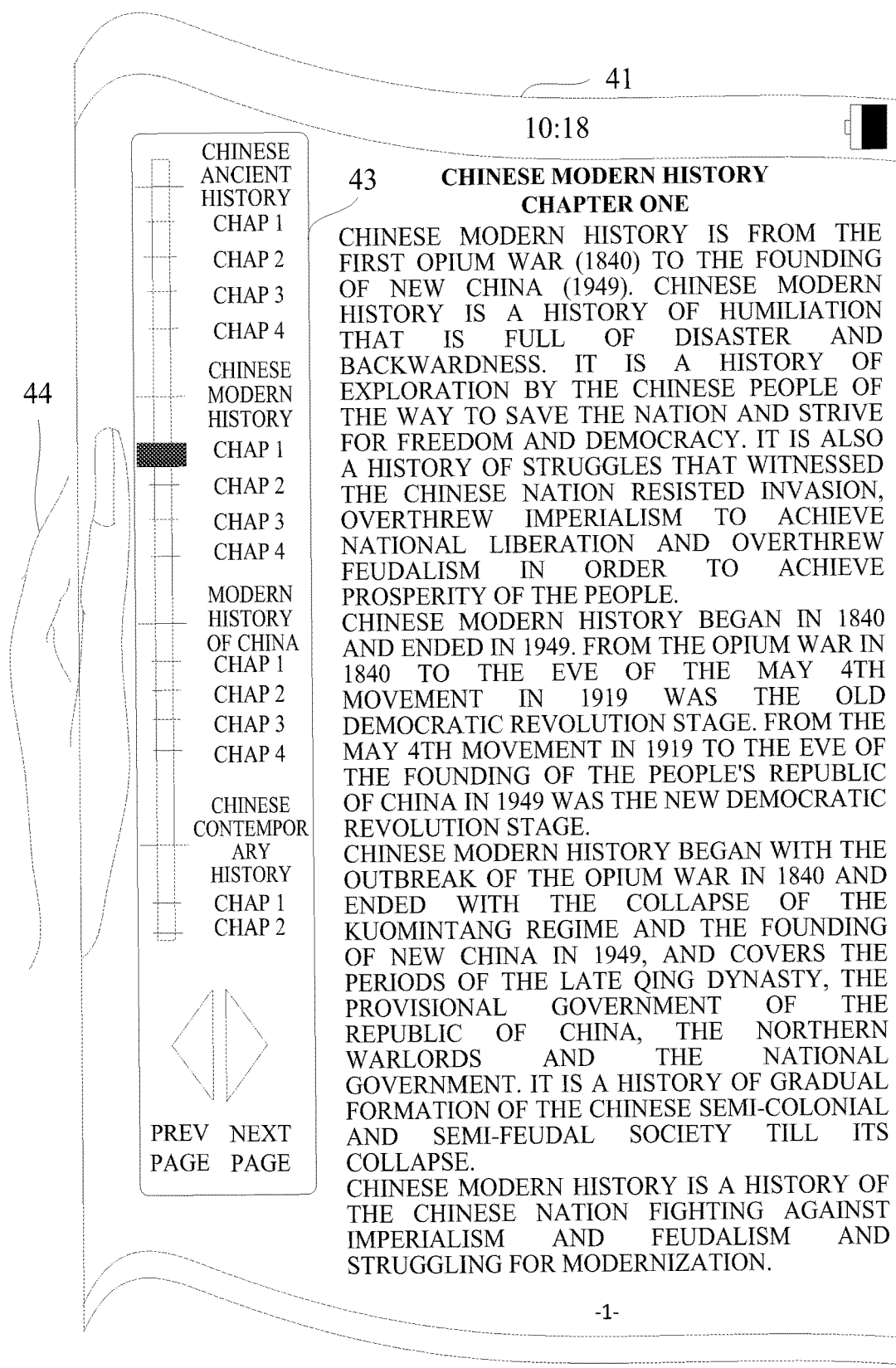
FIG. 4C is a schematic diagram of a touchable widget displaying manner.

For example, referring to FIGS. 4B and 4C, the flexible display device determines a combination of candidate areas 42a, 42b, 42c and 42d as a force bearing area, and displays a touchable widget 43 in the force bearing area. Furthermore, to avoid erroneous touch by a holding hand 44, the touchable widget 43 is displayed on the force bearing area outside the touch area (that is, the area at which the holding hand 44 touches the flexible display screen 41).

In conclusion, in the widget displaying method according to the embodiment, the flexible display apparatus determines, based on rigidness and distribution of its internal physical components, display areas corresponding to physical components with high rigidness as candidate areas, determines from the candidate areas a force bearing area having a high anti-deformation capacity and a high pressure bearing capacity, and then displays a touchable widget based on the force bearing area. As such, the method addresses the problem that the flexible display device bends under the action of gravity which makes touch operations on the flexible display screen difficult, and achieves the effect that a touchable widget is displayed based on a force bearing area with a high anti-deformation capacity and a high pressure bearing capacity, thereby ensuring that the user can stably perform touch operations on the force bearing area and improving success rate and accuracy of the touch operations.

In the embodiment, the flexible display device determines a candidate area or a candidate area combination having multiple candidate areas that matches a touchable widget as a force bearing area, and displays the touchable widget based on the force bearing area, thereby ensuring that the touchable widget achieves a good display effect.

Figure 4D:
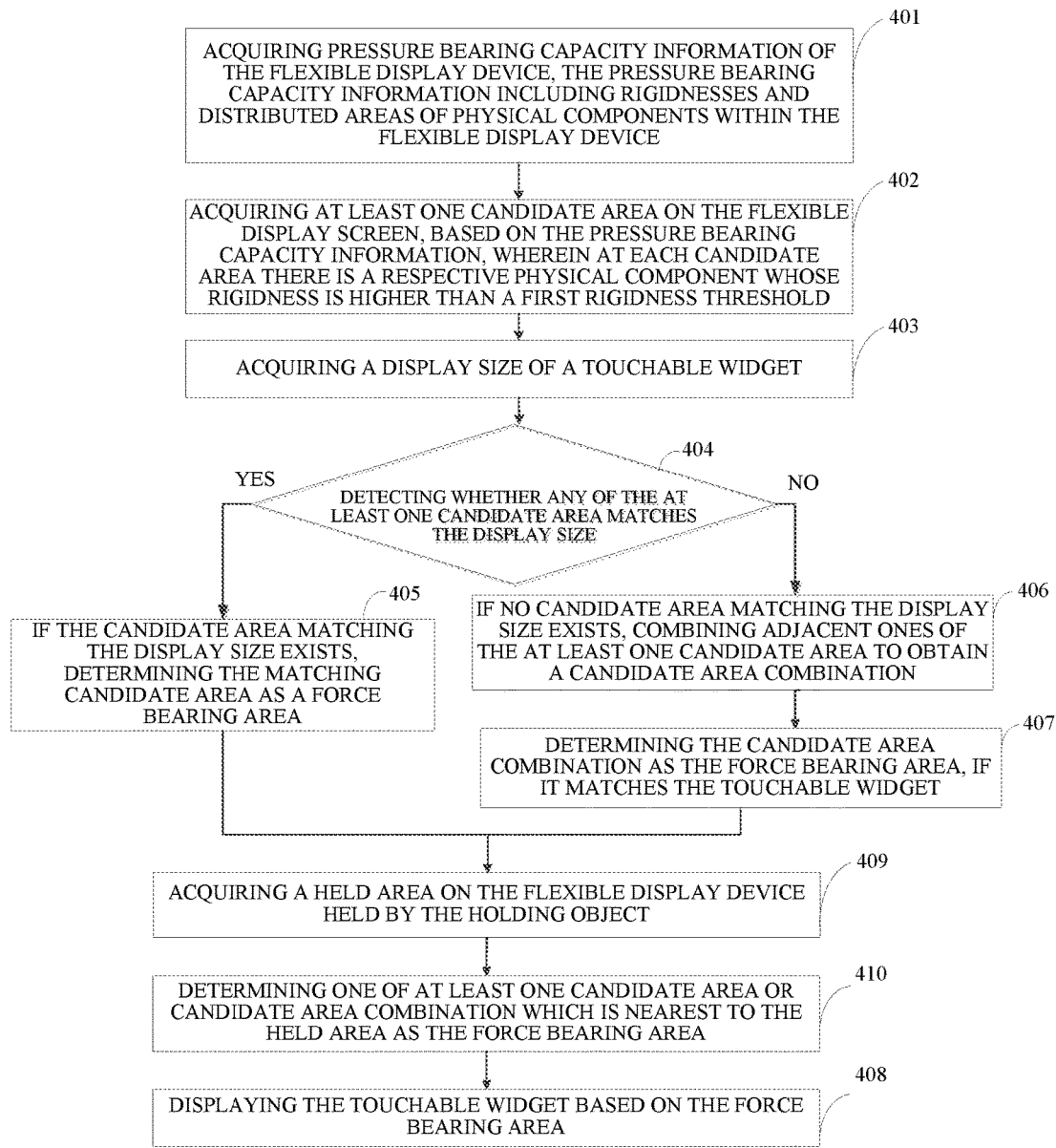
FIG. 4D is a flowchart of a widget displaying method according to still a further exemplary embodiment.

Optionally, to facilitate the user to perform touch operations and improve the stability of the user's operation, the flexible display device may determine a candidate area or a candidate area combination closer to the user's holding hand as the force bearing area, when there are at least one candidate area or candidate area combination that matches the touchable widget. As shown in FIG. 4D, after steps 405 and 407, the method further comprises the following steps.

In step 409, a held area on the flexible display device held by the holding object is acquired.

In an implementation, when the flexible display device is in the held state, the holding hand (object) will touch a part of the flexible display screen. The flexible display device can then determine, by utilizing a multi-touch function, the held area on the flexible display device held by the holding object. In another implementation, the flexible display device may determine the held area based on pressure sensors or deformation sensors formed on the flexible display device, which is not limited in the embodiment.

In step 410, one of at least one candidate area or candidate area combination which is nearest to the held area is determined as the force bearing area.

After determining the held area, the flexible display device further calculates distances between the held area and candidate areas or candidate area combinations matching the touchable widget, based on location information of the candidate areas or candidate area combinations.

When held by the holding hand, the flexible display device will deform at the held area. Being supported by the holding hand, the held area has a higher rigidness and can bear greater pressure. Therefore, the flexible display device determines a candidate area or a candidate area combination having the smallest distance from the held area as the force bearing area, thereby not only improving the reliability and stability of the user's touch operations but also facilitating the user to perform operations with a single hand.

For example, referring to FIGS. 4B and 4C, the combination of candidate areas 42a, 42b, 42c and 42d matches the size of a touchable widget 43, and the combination of candidate areas 42f, 42g, 42i and 42j matches the size of the touchable widget 43. Because the combination of the candidate areas 42a, 42b, 42c and 42d is closer to a holding hand 44 (corresponding to the held area), the flexible display device determines the combination of the candidate areas 42a, 42b, 42c and 42d as the force bearing area and displays the touchable widget 43 based on the area.

In this embodiment, the flexible display device determines a candidate area or a candidate area combination closer to the held area as the force bearing area and displays the touchable widget based on the force bearing area, thereby improving the stability of the user's touch operations and facilitating the user to perform operations with a single hand.

Figure 4E:
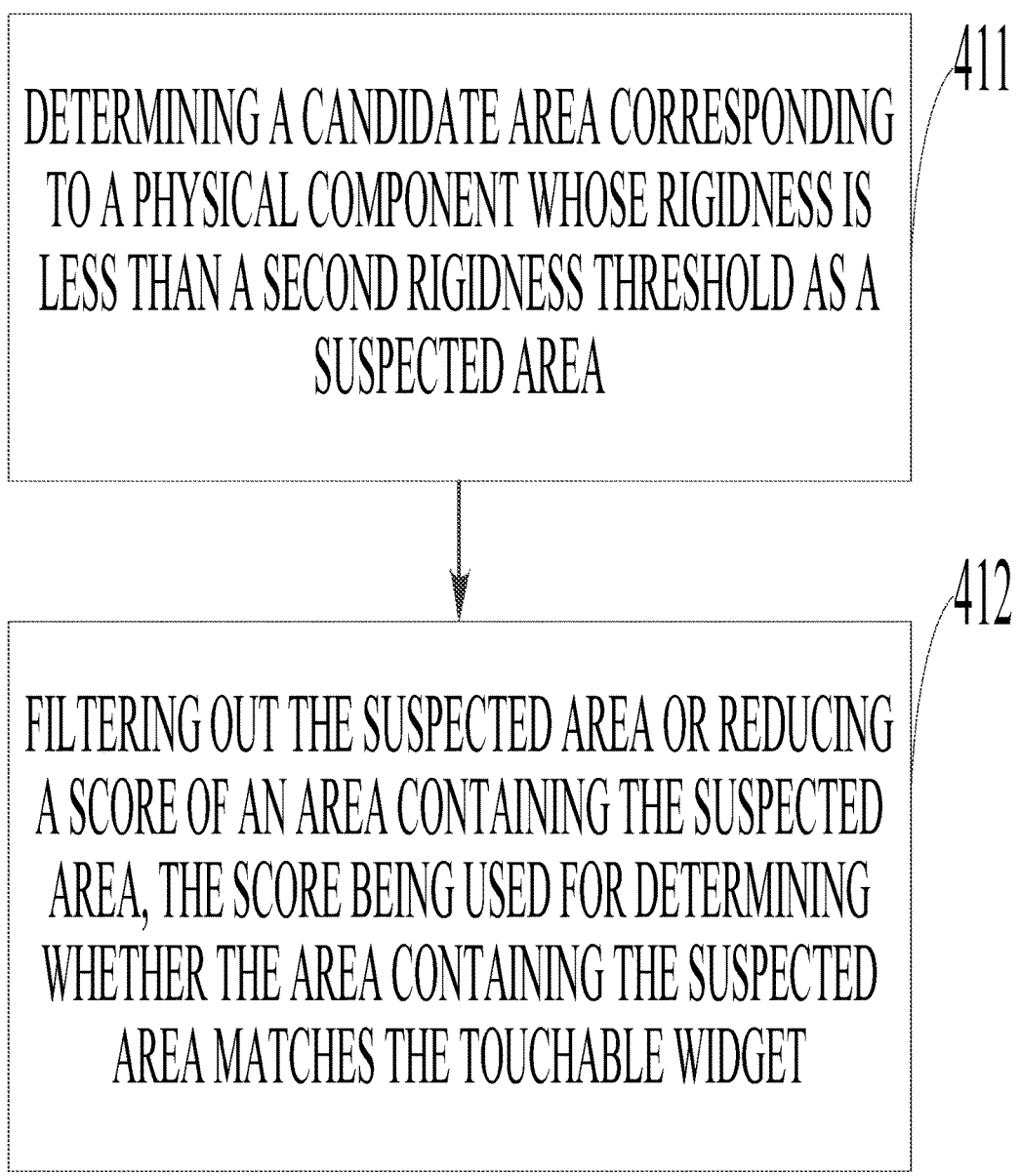
FIG. 4E is a flowchart of a touchable widget detecting process in the widget displaying methods shown in FIGS. 4A and 4D.

As shown in FIG. 4E, on the basis of FIGS. 4A and 4D, the method may further comprise the following steps.

In step 411, when the touchable widget is used to collect pressure information, a candidate area corresponding to a physical component whose rigidness is less than a second rigidness threshold is determined as a suspected area.

In operation, some touchable widget needs to collect, by a pressure sensor at a area where it resides, pressure data generated from press operation of the user, and performs a corresponding operation based on the pressure data. For example, a volume adjustment widget adjusts the volume according to a pressure value collected by a pressure sensor. To ensure normal operation of such a touchable widget, the touchable widget needs to be displayed on an area with a high pressure bearing capacity.

In an implementation, after the flexible display device acquires a candidate area, it determines whether the touchable widget to be displayed is used to collect pressure data. If the touchable widget is used to collect pressure data, the flexible display device determines a candidate area corresponding to a physical component whose rigidness is less than a second rigidness threshold as a suspected area and performs the following step 412. The second rigidness threshold is greater than the first rigidness.

In step 412, the suspected area is filtered out or a score of an area containing the suspected area is reduced, the score being used for determining whether the area containing the suspected area matches the touchable widget.

In an implementation, the flexible display device directly filters out the determined suspected area, so as not to subsequently determine the suspected area or a candidate area combination containing the suspected area as the force bearing area.

In another implementation, the flexible display device reduces the score of the determined suspected area, so that a score of an area containing the suspected area is reduced.

In this way, in subsequently determining, for each area on the flexible display screen, whether the area matches the touchable widget, the probability of selecting the area containing the suspected area can be reduced.

It should be noted that the above steps 411 and 412 may be executed after the step 402 or 403 and that the execution order is not limited in the embodiment.

In the following are described apparatus embodiments which can implement method embodiments of the disclosure. For details not disclosed in the apparatus embodiments, reference can be made to the method embodiments of the disclosure.

Figure 5:
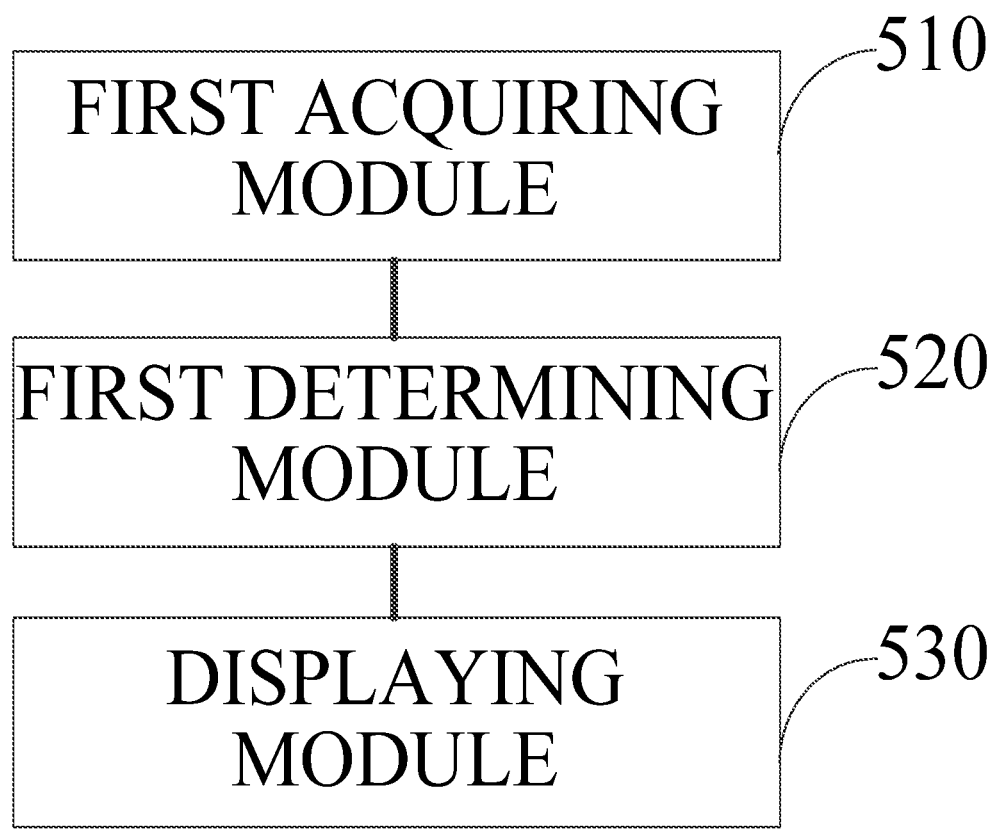
FIG. 5 is a schematic structural diagram of a widget displaying apparatus according to an exemplary embodiment.

FIG. 5 is a schematic structural diagram of a widget displaying apparatus according to an exemplary embodiment. The widget displaying apparatus may be implemented with a dedicated hardware circuit or a combination of hardware and software as the entirety or a part of a flexible display device. The widget displaying apparatus comprises the following modules 510-520.

The first acquiring module 510 is configured to acquire pressure bearing capacity information of the flexible display device, the pressure bearing capacity information indicating pressure bearing capacities of different areas on the flexible display device.

The first determining module 520 is configured to determine a force bearing area on the flexible display screen, based on the pressure bearing capacity information.

The displaying module 530 is configured to display a touchable widget, based on the force bearing area.

In summary, with the widget displaying apparatus according to the embodiment, pressure bearing capacity information of a flexible display device is acquired, so that a force bearing area with a high pressure bearing capacity on the flexible display screen is determined according to pressure bearing capacities of areas on the flexible display device indicated by the pressure bearing capacity information; and a touchable widget is displayed based on the force bearing area, thereby ensuring that a user can stably operate the touchable widget within the force bearing area. As such, it addresses the problem that the flexible display device bends under the action of gravity which makes it difficult for the user to perform touch operations on the flexible display screen, and achieves the effect that a touchable widget is displayed on an area with a high pressure bearing capacity, thereby ensuring the stability in performing by the user of touch operations on the flexible display device and improving success rate and accuracy of the touch operations.

Optionally, the pressure bearing capacities are related to a held state of the flexible display device, and the pressure bearing capacity information includes information on a held area on the flexible display device held by a holding object. The first determining module 520 comprises: a first acquiring sub-module configured to acquire the held area on the flexible display device held by the holding object based on the pressure bearing capacity information, the held area being a touch area where the holding object touches the flexible display device; and a first determining sub-module configured to determine the force bearing area on the flexible display screen, based on the held area.

Optionally, the first determining sub-module comprises: a first acquiring unit configured to acquire curvatures of deformed areas around the held area, the curvatures indicating deformations of the deformed areas; and a determining unit configured to determine the force bearing area, based on the curvatures of the deformed areas.

Optionally, the first determining unit is configured to: detect whether the curvatures of the deformed areas are greater than a first curvature threshold, in an ascending order of distances from the deformed areas to the held area; when detecting that the curvature of one of the deformed areas is smaller than the first curvature threshold, stop detection, for any deformed area which is farther from the held area than said one of the deformed areas, whether its curvature is greater than the first curvature threshold; and determine a deformed area on the flexible display screen whose curvature is greater than the first curvature threshold as the force bearing area.

Optionally, the flexible display device is provided with deformation sensors configured to collect deformation data of the flexible display device. The first acquiring unit is configured to: acquire the deformation data collected by the deformation sensors; and calculate the curvatures of the deformed areas around the held area, based on the deformation data.

Optionally, the displaying module 530 comprises: a second determining sub-module configured to determine a touch area where the holding object touches the flexible display screen; and a first displaying sub-module configured to display the touchable widget on the force bearing area outside the touch area.

Optionally, the apparatus further comprises: a detecting module configured to detect whether the flexible display device is stretched; and a first removing module or a second removing module. The first removing module is configured to, if it is detected that the flexible display device is stretched, remove the touchable widget. The second removing module is configured to: if it is detected that the flexible display device is stretched, display a removal widget; detect whether the removal widget receives a removal signal; and if the removal widget receives a removal signal, remove the touchable widget.

Optionally, the detecting module comprises: a second acquiring sub-module configured to acquire a curvature of the force bearing area; and a first detecting sub-module configured to detect whether the curvature of the force bearing area is smaller than a second curvature threshold and to determine that the flexible display device is stretched if the curvature of the force bearing area is smaller than the second curvature threshold.

Optionally, the flexible display device has a deformation control function. The apparatus further comprises: a second acquiring module configured to acquire deformation parameters of the force bearing area, the deformation parameters including a curvature of the force bearing area and position information of the force bearing area; and a shape maintaining module configured to maintain a shape of the force bearing area, based on the deformation parameters. The shape of the force bearing area may be maintained by at least one of increasing a voltage of the force bearing area, increasing a current of the force bearing area and increasing a temperature of the force bearing area.

In this embodiment, the flexible display device acquires a held area on the flexible display device held by a holding object, determines a force bearing area on the flexible display screen based on the held area and then displays a touchable widget based on the force bearing area, taking into account that the flexible display screen has a higher anti-deformation capacity and a higher pressure bearing capacity at the held area. As such, the method addresses the problem that the flexible display device bends under the action of gravity which makes it difficult for the user to perform touch operations on the flexible display screen, and achieves the effect that a force bearing area on the flexible display screen with a higher pressure bearing capacity is determined dynamically according to a held state of the flexible display device and is used for receiving the user's touch operation, thereby ensuring that the user can stably perform touch operations on the force bearing area and improving success rate and accuracy of the touch operations.

In this embodiment, when having a deformation control function, the flexible display device maintains the shape of the force bearing area according to deformation parameters of the force bearing area, thereby improving the stability of the force bearing area and facilitating the user to perform touch operations on the force bearing area.

In this embodiment, after determining the force bearing area based on the held area on the flexible display device held by the holding object, the flexible display device further determines a touch area where the holding object touches the flexible display screen and displays the touchable widget on the force bearing area outside the touch area, thereby avoiding misoperation caused by the holding object and improving the accuracy of the touch operations.

In this embodiment, the flexible display device detects curvatures of deformed areas around the held area in an ascending order of distances from the deformed areas to the held area and, when detecting that the curvature of one of the deformed areas is smaller than a first curvature threshold, stops curvature detection for any farther deformed area, so that there is no need to detect curvatures of all the deformed areas on the flexible display screen in the process of determining the force bearing area, thereby reducing the amount of computation and further improving the efficiency of determining the force bearing area.

In this embodiment, the flexible display device determines whether it is stretched based on the change in the curvature of the force bearing area, and stops displaying of the touchable widget when the flexible display device is stretched, thereby improving user experience. Meanwhile, it can be determined whether the flexible display device is stretched simply by detecting the curvature of the force bearing area. As the detection efficiency is high, the response speed of the flexibly display device is further improved.

In the embodiment, when the flexible display device is stretched, a corresponding removal widget is displayed on the flexible display screen instead of directly removing the touchable widget, and the touchable widget on the force bearing area is removed when it is detected that the user touches the removal widget, thereby avoiding mistaken removal of the touchable widget due to misoperation of the user.

Optionally, the pressure bearing capacities are related to rigidness of different areas on the flexible display device, and the pressure bearing capacity information includes rigidness and distribution of physical components within the flexible display device. The first determining module 520 comprises: a third acquiring sub-module configured to acquire at least one candidate area on the flexible display screen, based on the pressure bearing capacity information, wherein at each candidate area there is a respective physical component whose rigidness is higher than a first rigidness threshold; and a third determining sub-module configured to determine the force bearing area based on the at least one candidate area.

Optionally, the third determining sub-module comprises: a second acquiring unit configured to acquire a display size of the touchable widget; a detecting unit configured to detect whether a candidate area matching the display size exists among the at least one candidate area; and a fourth determining unit configured to, if the candidate area matching the display size exists, determine the matching candidate area as the force bearing area.

Optionally, the third determining sub-module further comprises: a combining unit configured to, if no candidate area matching the display size exists, combining adjacent ones of the at least one candidate area to obtain a candidate area combination; and a fifth determining unit configured to determine the candidate area combination as a force bearing area, if it matches the touchable widget.

Optionally, the combining unit is configured to: calculate a degree of combination for the adjacent ones of the at least one candidate area, the degree of combination relating to distances between the adjacent candidate areas and rigidness of physical components corresponding to the adjacent candidate areas; and combine the adjacent candidate areas to obtain the candidate area combination, if the degree of combination is greater than a predetermined combination degree threshold.

Optionally, the fifth determining unit is configured to: score the candidate area combination, according to at least one scoring criteria; and determine the candidate area combination as matching the touchable widget, if its score is greater than a predetermined score threshold. The at least one scoring criteria include at least one of an average rigidness of the candidate area combination, a degree of match between the candidate area combination and the display size, and a distance between the candidate area combination and the held area held by the holding object.

Optionally, when there is at least one candidate area or candidate area combination that matches the touchable widget, the third determining sub-module further comprises: a third acquiring unit configured to acquire a held area on the flexible display device held by a holding object; and a sixth determining unit configured to determine one of the at least one candidate area or candidate area combination which is nearest to the held area as the force bearing area.

Optionally, when the touchable widget is configured to collect pressure information, the apparatus further comprises: a second determining module configured to determine, from the at least one candidate area, a candidate area corresponding to a physical component whose rigidness is less than a second rigidness threshold as a suspected area; and a processing module configured to filter out the suspected area or reduce a score of an area containing the suspected area, the score being used for determining whether the area containing the suspected area matches the touchable widget. The second rigidness threshold is greater than the first rigidness threshold.

Optionally, the displaying module 530 comprises: a superposing sub-module configured to superpose a graphic layer upon currently displayed contents on the force bearing area; and a second displaying sub-module configured to display the touchable widget on the graphic layer.

In this embodiment, the flexible display apparatus determines, based on rigidness and distribution of its internal physical components, display areas corresponding to physical components with high rigidness as candidate areas, determines from the candidate areas a force bearing area having a high anti-deformation capacity and a high pressure bearing capacity, and then displays a touchable widget based on the force bearing area. As such, the method addresses the problem that the flexible display device bends under the action of gravity which makes it difficult for the user to perform touch operations on the flexible display screen, and achieves the effect that a touchable widget is displayed based on a force bearing area with a high anti-deformation capacity and a high pressure bearing capacity, thereby ensuring that the user can stably perform touch operations on the force bearing area and improving success rate and accuracy of the touch operations.

In the embodiment, the flexible display device determines a candidate area or a candidate area combination composed of multiple candidate areas that matches a touchable widget as a force bearing area, and displays the touchable widget based on the force bearing area, thereby ensuring that the touchable widget achieves a good display effect.

In this embodiment, the flexible display device determines a candidate area or a candidate area combination closer to the held area as the force bearing area and displays the touchable widget based on the force bearing area, thereby improving the stability of the user's touch operations and facilitating the user to perform operations with a single hand.

Figure 6:
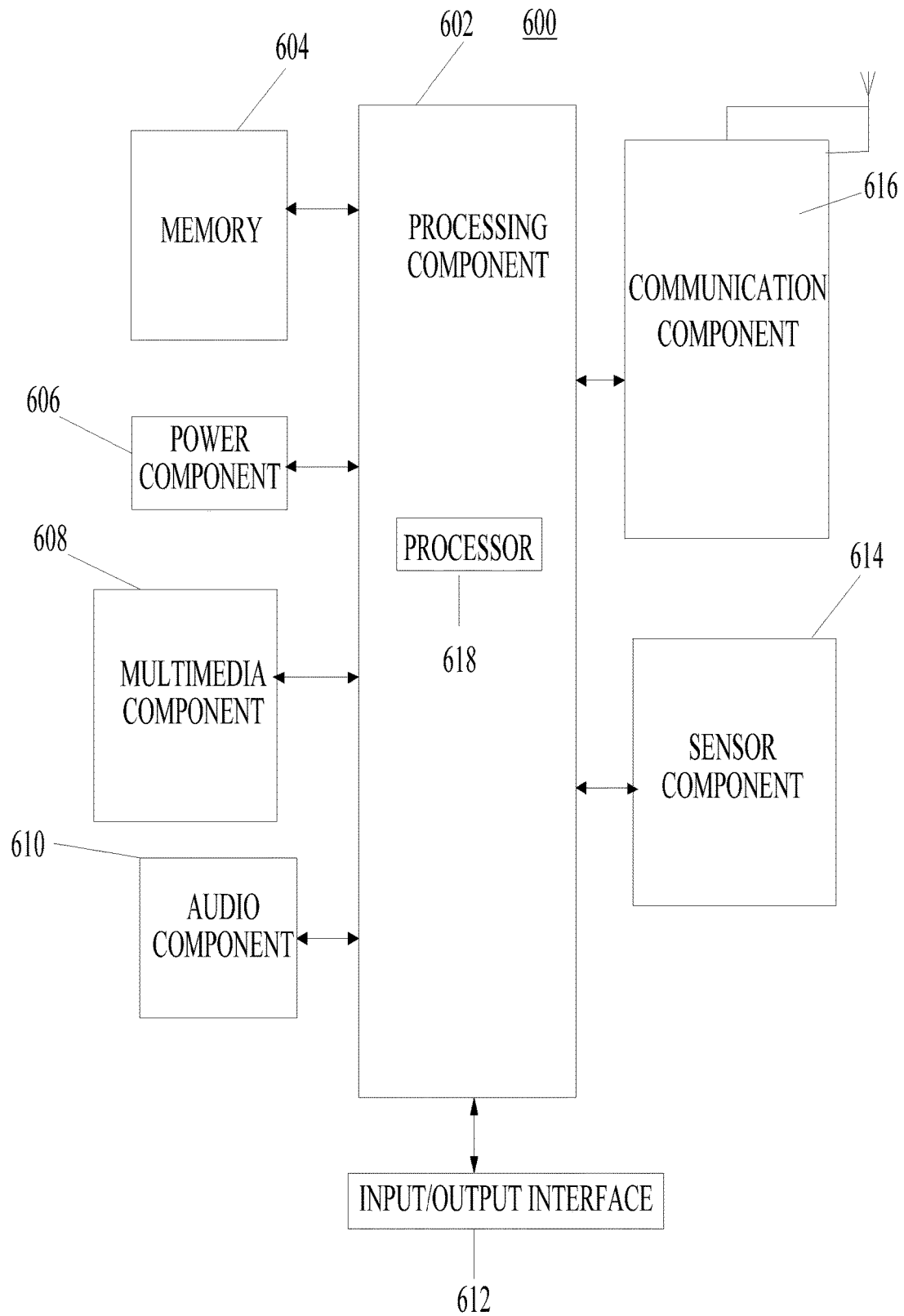
FIG. 6 is a block diagram of a flexible display device according to an exemplary embodiment.

FIG. 6 is a block diagram of a flexible display device according to an exemplary embodiment. For example, the flexible display device 600 may be a smart phone, a tablet, an e-book reader or the like equipped with a flexible display screen.

As shown in FIG. 6, the flexible display device 600 may include one or more of the following components: a processing component 602, a memory 604, a power component 606, a multimedia component 608, an audio component 610, an input/output (I/O) interface 612, a sensor component 614, and a communication component 616, all of which have been subject to flexibility treatment.

The processing component 602 typically controls overall operations of the flexible display device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the flexible display device 600. Examples of such data include instructions for any applications or methods operated on the flexible display device 600, touch data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the flexible display device 600. The power component 606 may include a power management system, one or more power sources, and any other components associated with the generation, management, and distribution of power in the flexible display device 600.

The multimedia component 608 includes a screen providing an output interface between the flexible display device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the flexible display device 600 is in an operation mode, such as a photographing mode or a video mode. Each of the front camera and the rear camera may be a maintained optical lens system or have focus and optical zoom capability. In embodiments of the present disclosure, the multimedia component 608 is a flexible display screen.

The audio component 610 is configured to output and/or input audio signals. For example, the audio component 610 includes a microphone ("MIC") configured to receive an external audio signal when the flexible display device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the flexible display device 600. For instance, the sensor component 614 may detect an open/closed status of the flexible display device 600, relative positioning of components, e.g., the display and the keypad, of the flexible display device 600, a change in position of the flexible display device 600 or a component of the flexible display device 600, a presence or absence of user touch with the flexible display device 600, an orientation or an acceleration/deceleration of the flexible display device 600, and a change in temperature of the flexible display device 600. The sensor component 614 may include a proximity sensor configured to detect the presence of nearby objects without any physical touch. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor. In the present embodiment, the sensor component 614 includes a fingerprint identifying sensor which is a press-type fingerprint sensor or a slide-type fingerprint sensor (integrated in a button and) configured to collect a user's fingerprint image. In the embodiment, the sensor component 614 includes deformation sensors configured to collect deformation data of the flexible display device 600, and the deformation sensor may be a piezoelectric film sensor.

The communication component 616 is configured to facilitate communication, wired or wireless, between the flexible display device 600 and other devices. The flexible display device 600 can access a wireless network based on a communication standard, such as WiFi, 2G, or 3G, or a combination thereof. In one embodiment, the communication component 616 receives a broadcast signal or broadcast associated information from an external broadcast management system via a broadcast channel. In one embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the flexible display device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, there is also provided a non-transitory computer readable storage medium including instructions, such as included in the memory 604, executable by the processor 620 in the flexible display device 600, for performing the above-described widget displaying methods. For example, the non-transitory computer readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A widget displaying method for use in a flexible display device comprising a flexible display screen, the method comprising:
  acquiring pressure bearing capacity information of the flexible display device, the pressure bearing capacity information indicating pressure bearing capacities of a plurality of areas on the flexible display device;
  determining a force bearing area on the flexible display screen, based on the pressure bearing capacity information; and
  displaying a touchable widget, based on the force bearing area;
  wherein the pressure bearing capacities are related to rigidness of the plurality of areas on the flexible display device, and the pressure bearing capacity information includes rigidness and distribution of physical components within the flexible display device, and
  wherein determining the force bearing area on the flexible display screen based on the pressure bearing capacity information comprises:
    acquiring at least one candidate area on the flexible display screen, based on the pressure bearing capacity information, wherein each candidate area comprises a respective physical component whose rigidness is higher than a first rigidness threshold; and determining the force bearing area based on the at least one candidate area.

2. The method of claim 1, wherein the pressure bearing capacities are related to a held state of the flexible display device, and the pressure bearing capacity information includes information on a held area on the flexible display device held by a holding object, and
wherein determining the force bearing area on the flexible display screen based on the pressure bearing capacity information comprises:
acquiring the held area on the flexible display device held by the holding object based on the pressure bearing capacity information, the held area being a touch area where the holding
determining the force bearing area on the flexible display screen, based on the held area.

3. The method of claim 2, wherein determining the force bearing area on the flexible display screen based on the held area comprises:
acquiring curvatures of deformed areas around the held area, the curvatures indicating deformations of the deformed areas; and
determining the force bearing area, based on the curvatures of the deformed areas.

4. The method of claim 3, wherein determining the force bearing area based on the curvatures of the deformed areas comprises:
detecting whether the curvatures of the deformed areas are greater than a first curvature threshold, in an ascending order of respective distances from the deformed areas to the held area;
when it is detected that the curvature of one of the deformed areas is smaller than the first curvature threshold, stopping detecting, for any deformed area which is farther from the held area than said one of the deformed areas, whether its curvature is greater than the first curvature threshold; and
determining one or more deformed areas on the flexible display screen whose curvature is greater than the first curvature threshold as the force bearing area.

5. The method of claim 3, wherein the flexible display device comprises deformation sensors configured to collect deformation data of the flexible display device, and
wherein acquiring curvatures of the deformed areas around the held area comprises:
acquiring the deformation data collected by the deformation sensors; and
calculating the curvatures of the deformed areas around the held area, based on the deformation data.

6. The method of claim 2, wherein displaying the touchable widget based on the force bearing area comprises:
determining a touch area where the holding object touches the flexible display screen; and
displaying the touchable widget on the force bearing area outside the touch area.

7. The method of claim 2, further comprising:
detecting whether the flexible display device is stretched; and
if it is detected that the flexible display device is stretched, removing the touchable widget, or
if it is detected that the flexible display device is stretched, displaying a removal widget; detecting whether the removal widget receives a removal signal; and if the removal widget receives a removal signal, removing the touchable widget.

8. The method of claim 7, wherein detecting whether the flexible display device is stretched comprises:
acquiring a curvature of the force bearing area;
detecting whether the curvature of the force bearing area is smaller than a second curvature threshold;
if the curvature of the force bearing area is smaller than the second curvature threshold, determining that the flexible display device is stretched.

9. The method of claim 2, wherein the flexible display device has a deformation control function, and the method further comprises:
acquiring deformation parameters of the force bearing area, the deformation parameters including a curvature of the force bearing area and position information of the force bearing area;
maintaining a shape of the force bearing area, based on the deformation parameters.

10. The method of claim 1, wherein determining the force bearing area based on the at least one candidate area comprises:
acquiring a display size of the touchable widget;
detecting whether any of the at least one candidate area matches the display size; and
if there is a candidate area matching the display size, determining the matching candidate area as the force bearing area.

11. The method of claim 10, wherein determining the force bearing area based on the at least one candidate area further comprises:
if there is not any candidate area matching the display size, combining adjacent ones of the at least one candidate area to obtain a candidate area combination; and
determining the candidate area combination as the force bearing area, if it matches the touchable widget.

12. The method of claim 11, wherein combining the adjacent ones of the at least one candidate area to obtain the candidate area combination comprises:
calculating a degree of combination for the adjacent ones of the at least one candidate area, the degree of combination being relating to distances between each two of the adjacent candidate areas and rigidness of physical components corresponding to the adjacent candidate areas;
combining the adjacent candidate areas to obtain the candidate area combination, if the degree of combination for the adjacent candidate areas is greater than a predetermined combination degree threshold.

13. The method of claim 11, wherein determining the candidate area combination as the force bearing area if it matches the touchable widget comprises:
scoring the candidate area combination, according to at least one scoring criteria;
determining the candidate area combination as matching the touchable widget, if its score is greater than a predetermined score threshold,
wherein the at least one scoring criteria include at least one of the following: an average rigidness of the candidate area combination, a degree of match between the candidate area combination and the display size, and a distance between the candidate area combination and the held area held by the holding object.

14. The method of claim 10, wherein, when there is at least one candidate area or candidate area combination that matches the touchable widget, determining the force bearing area based on the at least one candidate area further comprises:
acquiring a held area on the flexible display device held by a holding object;

determining one of the at least one candidate area or candidate area combination which is nearest to the held area as the force bearing area.

15. The method of claim 1, wherein, when the touchable widget is configured to collect pressure information, the method further comprises: after acquiring the at least one candidate area on the flexible display screen,
- determining, from the at least one candidate area, a candidate area corresponding to a physical component whose rigidness is less than a second rigidness threshold as a suspected area; and
- filtering out the suspected area or reducing a score of an area containing the suspected area, the score being used for determining whether the area containing the suspected area matches the touchable widget,
- wherein the second rigidness threshold is greater than the first rigidness threshold.

16. The method of claim 1, wherein displaying the touchable widget based on the force bearing area comprises:
- superposing a graphic layer upon currently displayed contents on the force bearing area; and
- displaying the touchable widget on the graphic layer.

17. A widget displaying apparatus for use in a flexible display device, the apparatus comprising:
- a processor;
- a flexible display screen electrically coupled with the processor; and
- a memory storing instructions executable by the processor,
- wherein the processor is configured to:
- acquire pressure bearing capacity information of the flexible display device, the pressure bearing capacity information indicating pressure bearing capacities of a plurality of areas on the flexible display device;
- determine a force bearing area on the flexible display screen, based on the pressure bearing capacity information; and
- display a touchable widget, based on the force bearing area;
- wherein the pressure bearing capacities are related to rigidness of the plurality of areas on the flexible display device, and the pressure bearing capacity information includes rigidness and distribution of physical components within the flexible display device, and
- wherein determining the force bearing area on the flexible display screen based on the pressure bearing capacity information comprises:
  - acquiring at least one candidate area on the flexible display screen, based on the pressure bearing capacity information, wherein each candidate area comprises a respective physical component whose rigidness is higher than a first rigidness threshold; and
  - determining the force bearing area based on the at least one candidate area.

18. The apparatus of claim 17, wherein the pressure bearing capacities are related to a held state of the flexible display device, and the pressure bearing capacity information includes information on a held area on the flexible display device held by a holding object, and
- wherein determining the force bearing area on the flexible display screen based on the pressure bearing capacity information comprises:
  - acquiring the held area on the flexible display device held by the holding object based on the pressure bearing capacity information, the held area being a touch area where the holding object touches the flexible display device; and
  - determining the force bearing area on the flexible display screen, based on the held area.

19. A non-transitory computer-readable storage medium having stored therein instructions that, when executed by a processor of a mobile terminal, cause the mobile terminal to perform a widget displaying method, the method comprising:
- acquiring pressure bearing capacity information of the flexible display device, the pressure bearing capacity information indicating pressure bearing capacities of a plurality of areas on the flexible display device;
- determining a force bearing area on the flexible display screen, based on the pressure bearing capacity information; and
- displaying a touchable widget, based on the force bearing area;
- wherein the pressure bearing capacities are related to rigidness of the plurality of areas on the flexible display device, and the pressure bearing capacity information includes rigidness and distribution of physical components within the flexible display device, and
- wherein determining the force bearing area on the flexible display screen based on the pressure bearing capacity information comprises:
  - acquiring at least one candidate area on the flexible display screen, based on the pressure bearing capacity information, wherein each candidate area comprises a respective physical component whose rigidness is higher than a first rigidness threshold; and
  - determining the force bearing area based on the at least one candidate area.

* * * * *